US010967449B2

(12) United States Patent
Haenle et al.

(10) Patent No.: US 10,967,449 B2
(45) Date of Patent: Apr. 6, 2021

(54) ROTARY TOOL

(71) Applicant: GUEHRING KG, Albstadt (DE)

(72) Inventors: Peter Haenle, Wales, WI (US);
Thomas Bischoff, Immenstaad (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 16/379,118

(22) Filed: Apr. 9, 2019

(65) Prior Publication Data

US 2019/0314903 A1    Oct. 17, 2019

(30) Foreign Application Priority Data

Apr. 12, 2018 (DE) ...................... 10 2018 108 767.5
Jan. 8, 2019 (DE) ...................... 10 2019 100 298.2

(51) Int. Cl.
| | | |
|---|---|---|
| B23D 77/02 | (2006.01) | |
| B23C 5/00 | (2006.01) | |
| B23D 77/00 | (2006.01) | |
| B23C 5/04 | (2006.01) | |
| B23D 77/04 | (2006.01) | |

(52) U.S. Cl.
CPC .............. *B23D 77/02* (2013.01); *B23C 5/006* (2013.01); *B23C 5/04* (2013.01); *B23D 77/00* (2013.01); *B23D 77/04* (2013.01); *B23D 2277/02* (2013.01)

(58) Field of Classification Search
CPC .... B23D 77/00; B23D 77/02; B23D 2277/02; B23C 5/006; B23C 5/04
See application file for complete search history.

(56) References Cited

U.S. PATENT DOCUMENTS

| | | | | |
|---|---|---|---|---|
| 5,605,420 | A * | 2/1997 | Feldsine | ................. B23C 5/006 407/32 |
| 6,120,218 | A * | 9/2000 | Bishop | .................... B23C 5/006 407/34 |
| 6,343,902 | B1 * | 2/2002 | Nishikawa | ................ B23C 3/02 407/31 |
| 6,595,727 | B2 * | 7/2003 | Arvidsson | ............... B23C 5/006 407/35 |

(Continued)

FOREIGN PATENT DOCUMENTS

| | | | | |
|---|---|---|---|---|
| DE | 925142 | C | 3/1955 | |
| DE | 3423279 | A1 * | 1/1986 | ........... B23C 5/2472 |

(Continued)

OTHER PUBLICATIONS

German Search Report (and translation provided by foreign counsel) from a corresponding German patent application (DE 10 2018 108 767.5) dated Feb. 5, 2019, 13 pages.

(Continued)

*Primary Examiner* — Eric A. Gates
(74) *Attorney, Agent, or Firm* — Burr & Brown, PLLC

(57) ABSTRACT

The invention relates to a rotary tool (1; 101; 201) for cutting large inside diameters at the outer circumference (2) of which at least one cutting edge (4) is arranged, comprising a support structure (10; 110; 210) which indirectly or directly supports the at least one cutting edge (4), and comprising a chucking portion (24) for coupling to a tool holder, wherein the support structure (10; 110; 210) widens in an umbrella-type manner starting from a coupling portion (11) adjacent to the chucking portion (24) and is radially stiffened by a stiffening structure (12).

24 Claims, 10 Drawing Sheets

(56) References Cited

U.S. PATENT DOCUMENTS

| | | | |
|---|---|---|---|
| 7,363,692 B2 * | 4/2008 | Kress | B23B 51/009 29/50 |
| 2005/0047883 A1 | 3/2005 | Bixler | |
| 2010/0183382 A1 | 7/2010 | Nedzlek et al. | |
| 2011/0188954 A1 | 8/2011 | Frank | |
| 2014/0161543 A1 | 6/2014 | Francis et al. | |
| 2015/0190867 A1 | 7/2015 | Roman et al. | |
| 2019/0099816 A1 * | 4/2019 | Zetek | B23C 5/06 |

FOREIGN PATENT DOCUMENTS

| | | | | |
|---|---|---|---|---|
| DE | 10300840 A1 * | 7/2004 | | B23B 29/0341 |
| DE | 10305991 A1 | 12/2004 | | |
| DE | 102007007399 A1 | 8/2008 | | |
| DE | 102009042951 B3 | 3/2011 | | |
| DE | 102017118604 A1 | 2/2018 | | |
| JP | 58-206305 | 12/1983 | | |
| JP | 2000246519 A * | 9/2000 | | |

OTHER PUBLICATIONS

European Search Report (and translation provided by foreign counsel) from a corresponding European patent application (EP 19167911.7) dated Oct. 18, 2019, 17 pages.

* cited by examiner

ROTARY TOOL

TECHNICAL FIELD

The invention relates to a rotary tool/rotating tool, for example in the form of a reamer or a stepped reamer, for cutting large inside/inner diameters, at the outer circumference of which at least one cutting edge is arranged, the rotary tool comprising a support structure which indirectly or directly supports the at least one cutting edge, and comprising a chucking portion for coupling to a tool holder. The chucking portion may take/have any shape, preferably such shape that it can be coupled to the respective spindle of a machine tool via common tool holders such as a hollow-shank taper holder (HSK taper).

STATE OF THE ART

Especially by the fact that more and more electromotive drives or conventional gearings having a higher number of speeds are required, there is a more urgent problem of high-precision cutting large inside diameters such as the inside diameter of a stator housing of an electric motor. The machining tools used here must be dimensionally stable and yet properly manageable. In particular, the tool must be adapted to be able to be safely handled even by an automatic tool changer of a cutting machine.

Concerning the efficiency of an electric motor, it is of salient importance to exactly comply with predetermined geometric measures due to the interactions between the rotor and the stator. Since the cutting tool for cutting large inside diameters has a considerable volume, care has to be taken that the weight of the rotary tool will not negatively affect the dimensional stability of machining. In addition, production is intended to be still economically realizable with available materials.

SUMMARY OF THE INVENTION

Therefore, it is the object of the invention to provide a rotary tool especially for the cutting production of large-diameter boreholes which excels by excellent handling so that during machining the observation of the dimensional stability of the borehole is safeguarded. Said rotary tool is moreover intended to be manufactured at low cost and yet to meet the requirements of high mechanical load capacity.

According to the invention, the object is achieved in a generic rotary tool by the fact that the support structure widens/expands in an umbrella-type or lightshade-type or jaw-type/jaw-like manner starting from a coupling portion adjacent to the chucking portion and is radially stiffened by a stiffening structure. The umbrella-type or jaw-type widening of the support structure, on the one hand, helps to ensure proper torque transmission from the chucking portion to the support structure and, on the other hand, helps to design the rotary tool in light-weight construction as well as to manufacture it at low cost and in a simple manner. The provided rotary tool thus is designed in such a manner that the material required for its construction is as small as possible. The "principal function" of machining is adopted by the support structure, wherein starting from the chucking portion the torque and, resp., the force is introduced to the support structure, whereas the stiffening structure fulfils a "secondary function" and stiffens the support structure in the radial direction so that the at least one cutting edge is supported in the radial direction at the outer circumference of the rotary tool. By the umbrella-type or jaw-type widening, an appropriately high torsion resistance moment of the support structure and thus of the rotary tool can be formed due to a large distance of the support structure from an axis of rotation of the rotary tool. The umbrella-type widening results in a radially inner area or volume of the rotary tool which is located outside the torque transmission of the rotary tool, as afore-described. Said "freely available" volume located outside the force transmission enables a stiffening structure to be integrated in the rotary tool for stiffening the support structure in the radial direction, while the total weight of the tool is only insignificantly increased. Due to the resulting low weight of the rotary tool, the rotary tool can be handled by far better than it is known from the state of the art, even if it requires a considerable axial length. At the same time, dynamic unbalance loads and weight-related deflections of the rotary tool are reduced, thus resulting in a substantially increased machining accuracy.

Advantageous embodiments are claimed in the subclaims and will be explained in the following.

In a preferred embodiment, the stiffening structure may be in the form of a tension-compression strut frame/diagonal strut frame. The stiffening structure in the form of the tension-compression strut frame is a useful design of a light-weight construction which may be constructively adapted to absorb especially high tensile and compressive forces in especially predetermined directions. The term of tension-compression strut frame does not only refer to a frame construction, but the tension-compression strut frame may also be configured in 3D shape similarly to a structure such as a bone trabecula, for example. For the stiffening structure complex 3D structures are possible. It is crucial that the stiffening structure forms cavities by the tension-compression strut frame and forces can be guided between connecting points of the struts via struts of the tension-compression strut frame which are mainly dimensioned for tension-compression.

In another preferred embodiment, the support structure may have at least two support portions diametrically opposed to each other with respect to an axis of rotation of the rotary tool each of which indirectly or directly carries at least one cutting edge and which are interconnected by the stiffening structure. The rotary tool thus radially outside has two support portions carrying two opposed cutting edges, the support portions being interconnected by the substantially radially inner stiffening structure. While, as afore-described, the support portions have the function of supporting the cutting edges and so-to-speak materialize the functional portion of the rotary tool for machining, it is the function of the stiffening structure to provide a stiff connection of the two support portions to each other and to the chucking portion. A load occurring by cutting can be transmitted by the diametrically opposed support portions from the one support portion via the stiffening structure to the other support portion and vice versa so that the two support portions are backing each other.

It is of advantage when the stiffening structure includes at least two radially extending struts. Loads in the radial direction can be absorbed by the struts in the radial direction. Especially/preferably, diametrically opposed support portions can be connected by the struts.

Preferably, at least two struts may extend in a plane orthogonally to the axis of rotation and preferably in parallel to each other. The at least two struts need not necessarily intersect the axis of rotation but may be arranged in a plane orthogonally offset against the axis of rotation. Of preference, the at least two struts connect the support portions.

It is of advantage when the stiffening structure, when viewed in the axial direction, has a lattice/grid design. The configuration of the stiffening structure as a lattice-type/latticed tension-compression strut frame is advantageous to the effect that the one struts formed in parallel to each other and the other struts formed in parallel to each other can absorb the loads of the support structure in the respective preferred directions. In particular, in the embodiment of two diametrically opposed support portions the stiffening structure includes three struts arranged in parallel to each other which interconnect the support portions and another strut vertically intersecting said struts and being arranged centrally between the support portions for stiffening.

In a preferred embodiment, the stiffening structure may include at least two axially offset struts. Preferably, said struts intersect the axis of rotation. In this way, the rotary tool is stiffened along its axial axis in the radial direction.

In particular, the stiffening structure may have a strut extending coaxially to the axis of rotation. Said strut extending coaxially to the axis of rotation serves for axial stiffening.

Advantageously, the struts may have a cylindrical and/or box-shaped and/or tubular design. The struts may have, when viewed in cross-section, a circular, rectangular or annular structure. This configuration serves for optimized tension and pressure absorption of the struts. The dimension of the cross-section may vary within one strut. For example, a strut having a circular or annular structure (in cross-section) may have different diameters along its longitudinal axis.

In a preferred embodiment, the support structure and/or the stiffening structure may be manufactured generatively and, resp., additively. The generative/generic manufacturing method and, resp., the additive manufacturing is/are an efficient manufacturing technology for complex component geometries which permits to individually adapt the support structure to occurring mechanical load and, in this context, to provide a light-weight construction which can be designed to be even lighter as compared to conventional methods. In addition, undercuts can be incorporated by additive manufacturing. Equally, the support structure can be configured so that in different areas of the support structure different material can be used and thus dimensioning of the mechanical load and also of thermal expansion can be further improved. Especially, the struts of the stiffening structure can include a material different from that of the support portions of the support structure. Preferably, the support structure is produced by selective laser melting, selective laser sintering or electron-beam melting.

The generative or additive manufacturing of a support structure with integrated stiffening structure realized in light-weight construction, especially for the design of rotationally driven tools for machining large and, possibly, deep boreholes is the subject matter of an independent invention.

In a preferred variant which will possibly be independently claimed, the support structure and/or the stiffening structure may have a (mean) thermal expansion coefficient/a coefficient of linear expansion/an expansion coefficient of less than $$10 \cdot 10^{-6} \frac{1}{K} (10E-6\ 1/K, 10 \times 10^{\wedge}(-6) 1/K),$$

especially preferred less than $$7 \cdot 10^{-6} \frac{1}{K}$$

and extraordinarily preferred of less than $$2 \cdot 10^{-6} \frac{1}{K} (2E-6\ 1/K),$$

within the temperature range from 0 to 80° C. Especially preferred, the support structure has a thermal expansion coefficient of less than $$2 \cdot 10^{-6} \frac{1}{K}$$

even within the temperature range from 0 to 300° C. The especially low thermal expansion coefficient of the support structure helps to restrict the geometric variation especially in the radial direction which has a positive effect on dimensional stability of the rotary tool in the case of temperature variation. A "mean" thermal expansion coefficient in this context means that the support structure with e.g. different materials in different portions has an averaged thermal expansion coefficient, especially in the radial direction, which corresponds to the mean thermal expansion coefficient. In particular, the support structure has an isotropic thermal expansion coefficient in all directions. Alternatively, the support structure and/or the stiffening structure may include carbon-fiber reinforced plastic (CFRP) as a material which exhibits a direction-dependent thermal expansion coefficient. CFRP is a composite material of very low density with simultaneously high stiffness. The thermal expansion coefficient of CFRP is very low in the fiber direction and amounts to less than $$1 \cdot 10^{-6} \frac{1}{K}.$$

Especially, the struts of the stiffening structure may include the material of CFRP, with the fiber direction being arranged in parallel to the longitudinal axis of the struts. Thus, due to the low thermal expansion coefficient of CFRP, thermal expansion in the radial direction is restricted, while at the same time high tensile and compressive strength being maintained.

Especially preferred, the support structure may be made from composite material including Invar and/or titanium and/or a nickel-iron alloy. Invar is a binary iron-nickel alloy having an especially low thermal expansion coefficient and is also known under the designation Invar 36, Nilo alloy 36, Nilvar, Ni 36 or NiLo36. NiLo 36 has the material number 1.3912. Even up to temperatures of 500° C. its thermal expansion coefficient is below $$10 \cdot 10^{-6} \frac{1}{K}.$$

At the same time, Invar has a tensile strength Rm of about $$500 \frac{N}{mm^2}$$

and an E modulus of about 140 GPa to satisfy the strength requirements of the rotary tool. Titanium is stretchable as well as resistant to corrosion and temperature and has a thermal expansion coefficient of $$8.2 \cdot 10^{-6} \frac{1}{K}.$$

Appropriate alloys may reach tensile strengths Rm of sometimes far $$800 \frac{N}{mm^2}.$$

In particular, the support structure includes the titanium alloy Ti6Al4V (material number 3.7165).

It is of advantage when at least the stiffening structure is made from Invar. The stiffening structure is mainly responsible for thermal expansion; therefore, it is intended to have an as low thermal expansion coefficient as possible. Invar is a suitable material for this purpose. In particular, the entire support structure may be manufactured from Invar. As an alternative, the stiffening structure may be made from Invar and the support portions may be made from titanium.

Preferably, the support structure may be point-symmetric with respect to the axis of rotation of the rotary tool. The point-symmetric design promotes uniform rotational inertia and balanced movement of rotation of the rotary tool. Likewise, uniform load absorption is ensured in the radial direction around the axis of rotation.

Preferably the rotary tool may be adapted to machine an inside diameter of more than 200 mm, especially preferred of more than 300 mm and extraordinarily preferred of more than 400 mm. Those large inside diameters are important, for example, for stator housings of electric motors. The rotary tool according to the invention meets, despite large inside diameters, the highest requirements to the precision of machining already described in the introductory part which are made due to the high speeds of the electric motor in order to finally finish a main bore precisely to few µm.

Preferably, the rotary tool may be adapted to cut an inside diameter having an axial length of up to 400 mm.

In a preferred embodiment, the at least one cutting edge may be formed directly at the support structure or at a cutting member supported by the support structure. The cutting member forms a separate member which is especially replaceable and may include a material of particularly increased hardness different from the support structure.

Of preference, the cutting member may be held in an axially and/or radially adjustable cartridge. By means of the cartridge, a radial and/or axial position and/or an angular position of the cutting member and, consequently, of the cutting edge can be modified.

Of preference, the support structure may be divided in the axial direction at least into a first cutting step and a second cutting step, each carrying at least one cutting edge, wherein a cutting circle diameter of the first cutting step differs from that of the second cutting step. Such configuration of the support structure permits to achieve successive machining with successive increase in the cutting circle diameter. In particular, with a through-bore to be cut the rotary tool in this way can remove, with axial guiding, in the one cutting step initially a first volume and subsequently in the other cutting step an additional volume by cutting from the workpiece. By stepwise machining of the workpiece by means of the cutting steps a large volume of material can be removed in one single machining step. Alternatively, the rotary tool may be used to machine an inside diameter of a workpiece in such a way that a stepped inside diameter is formed due to the cutting steps.

Preferably, the cutting circle diameter of the cutting steps may increase toward the chucking portion and, resp., the coupling portion of the support structure.

In a preferred variant, the support structure may be divided in the axial direction into first to fifth cutting steps which are arranged to be axially partly overlapping toward the chucking portion, with the cutting circle diameter of the cutting steps increasing toward the cutting portion. Cutting of the inside diameter in five steps is achieved by the five cutting steps and the cutting circle diameters increasing toward the chucking portion. As an alternative, the rotary tool may as well configure an inside diameter having five steps and, resp., having five increasing cutting circle diameters.

According to another aspect of the invention, the cutting edges of the cutting steps may be arranged to be offset against each other in the circumferential direction about the axis of rotation. This promotes small axial expansion due to overlapping of the cutting steps as well as a more uniform force input of the cutting edges into the support structure.

Especially, radially outside the support structure includes block-shaped projections which bear the cutting edges.

Especially, the rotary tool may be cooled inside. To this end, the rotary tool includes fluid passages for cooling in its support structure.

In a preferred embodiment, the umbrella-type support structure may be in the form of a cup/pot.

According to another aspect of the invention, the umbrella-type support structure may be in the form of a cup having two sides cut-off in the axial direction, thus causing two flanks of the support structure to be formed. The flat cut-off sides of the support structure enable to rotary tool to be stackable and promote storage and logistics in machining centers, for example.

According to an independently claimable embodiment, the material of the support structure may be a fiber-reinforced plastic composite having a matrix system including embedded fibers and the fiber-reinforced plastic composite may include in at least one direction transversely to the axis of rotation a thermal expansion coefficient of less than 5 ppm/K (5E-6 1/K), preferably of less than 2 ppm/K, especially preferred of less than 1 ppm/K. Fiber-reinforced plastic (FRP) composite in several respects offers advantages for use in the rotary tool. On the one hand, by the selection and configuration of the fibers and, resp., fiber layers in the matrix system particular properties can be adjusted, on the other hand, they have a low weight and long service life while being highly mechanically loadable. Due to the low weight, a tilt moment of the rotary tool can be reduced, which results in the fact that the chucking portion and, resp., the diameter of the hollow shank cone can be designed to be smaller so that smaller spindles and especially already existing spindles and, resp., spindle systems can be used. In this embodiment, the fiber-reinforced plastic composite has a very low thermal expansion coefficient in at least one radial direction or in a direction transversely to the axis of rotation so as to ensure high dimensional stability of the position of the tool cutting edges when using the tool under thermal load. Thus, machine tools having a large nominal diameter can be manufactured in which the cutting edges vary the position relative to the axis of rotation only minimally even if the tool adopts relatively high temperatures, wherein at the same time the tool mass can be successfully reduced while the vibration damping property is improved.

In particular, the fiber-reinforced plastic composite may include (high modulus) PBO fibers and/or carbon fibers (also known under the designation CFRP fibers). Said fibers are especially suited for use in a rotary cutting tool as the fibers have a negative thermal expansion coefficient. Especially, the PBO fiber (brand name ZYLON® HM by TOYOBO Co., Ltd.) has a strong negative thermal expansion coefficient of −6 ppm/K. By means of proper fiber-matrix adhesion this characteristic is conferred upon the fiber-reinforced plastic composite. The term PBO fiber and the brand ZYLON® HM are used as synonyms. As compared to aramid fibers, for example, PBO fibers excel by substantially higher stiffness of the fiber, substantially lower moisture absorption and substantially higher stability to UV light. Moreover, vis-à-vis other polymeric high-duty fibers the PBO fiber known e.g. under the trade name "Dyneema" has an excellent fiber-matrix adhesion. Said fibers impart their characteristics, especially thermal expansion, in a particularly proper manner to the fiber-reinforced plastic composite. This helps to achieve especially the fact that an extremely high dimensional stability in the case of thermal load can be ensured by the selection of fibers even in the case of large volumes. The specific fiber-reinforced plastic composite including the carbon fibers and/or the PBO fibers thus meets the most important requirements of the application of a tool component, even if the latter has very large dimensions.

According to another preferred embodiment, the matrix system may include a thermosetting plastic matrix, preferably comprising vinyl ester resin, epoxy resin, phenol resin and/or unsaturated polyester resin as matrix component. Unsaturated polyester resin is inexpensive compared to other matrix resins and exhibits proper resistance to chemicals which is required when it is used in the rotary cutting tool. Since rapid hardening is easily possible, the unsaturated polyester resin is also suited for series production. Further, influence of moisture especially on the softening temperature is negligible. Epoxy resins exhibit an excellent bonding and adhesive property and moreover, due to the proper fiber-matrix adhesion and the low inherent shrinkage stresses, excellent fatigue strengths are achieved. Vinyl ester resins are inexpensive and equally show high fatigue strength. All of them have in common that they exhibit especially proper fiber-matrix adhesion with the PBO fibers and the carbon fibers.

Of preference, the fibers of the fiber-reinforced plastic composite may be embedded randomly in the matrix system in at least a two-dimensional plane so as to achieve an at least two-dimensional isotropic characteristic of the fiber-reinforced plastic composite. The at least two-dimensional plane is preferably located orthogonally to the axis of rotation to safeguard the dimensional stability of the rotary tool in the radial direction. In this way, in the case of mechanical load in the radial direction the fiber-reinforced plastic composite may absorb the same and (in the tool component) a direction of restricted load-bearing capacity is avoided.

Especially, the fibers may have a length ranging from 0.1 mm to 80 mm, especially preferred ranging from 1 mm to 60 mm and extraordinarily preferred ranging from 10 mm to 50 mm. Said lengths are especially suitable. In particular long fibers are especially suited for manufacturing tool components showing large radial extension so that, in terms of manufacture and in terms of the product, centrifugal forces and tool reaction forces are absorbed reliably and largely free from deformation and thermally caused changes of position of the tool cutting edges are limited.

Preferably, the rotary tool, especially the support structure, may have a modular design including separately formed and interconnectable tool components, wherein the material of those modules which connect the support portions in the radial direction is fiber-reinforced plastic composite. Thus, the rotary tool may exhibit a modular and, resp., a differential design, with the tool components which are crucial to dimensional stability in the radial direction including the material of fiber-reinforced plastic composite having the very low thermal expansion coefficient.

It may be useful when the support portions are arranged in circle segments around the axis of rotation and preferably include titanium as material. By arranging the support portions in circle segments about the axis of rotation, the support portions are not directly connected to each other in the circumferential direction but have a clearance therebetween. In the case of temperature variation within the support portions, the latter may expand unhindered in the circumferential direction and are not distorted. In the radial direction, the support portions have merely small thickness so that the thermal expansion exerts only little influence on the dimensional stability in the radial direction due to its proportionality to length. Preferably, the support portions may include titanium as a material which has only a low expansion coefficient, as already explained before.

According to another embodiment, the support structure may have a preferably rectangular or circular support plate oriented orthogonally to the axis of rotation including fiber-reinforced plastic composite comprising PBO fibers and/or carbon fibers which is fastened, especially screwed and/or adhesively joined, preferably bonded, to the chucking portion and to the support portions. This configuration of the support structure with modular tool components permits the support plate oriented orthogonally to the axis of rotation to transmit the torque and to minimize thermal expansion in the radial direction by means of the fiber-reinforced plastic composite. The chucking portion may be fastened to the support plate as usual as a standard module, however.

Preferably, the support plate may include at least one, preferably four, integrated cooling passage(s) for conveying coolant from the chucking portion radially outwardly, preferably toward the support portions and especially preferred directly toward the cutting edges. Cooling lubricant or coolant, especially cooling oil, can be reliably fed to the area of the cutting edges starting from the chucking portion through a cooling passage integrated in the support plate, even if the cutting edges are located at a considerable distance from the axis of rotation and/or from the feeding point in the chucking portion.

Preferably, the stiffening structure may be in the form of a supporting plate or a supporting lattice including the material of fiber-reinforced plastic composite. The stiffening structure, too, may include fiber-reinforced plastic composite as material and again may take advantage of the low thermal expansion in the radial direction.

According to one aspect of the invention, the support plate and/or the stiffening structure may be screwed and/or adhesively joined, preferably bonded to the support portions, preferably in the axial direction. For a tool component including the material of fiber-reinforced plastic composite introduced boreholes and, resp., through-holes or adhesive joining are especially suited, as this can be realized easily and efficiently in terms of manufacture.

According to another aspect of the invention, the support plate and/or the stiffening structure may include a groove, especially a triangular groove, having a recess in the axial direction which extends, preferably in the circumferential direction, concentrically about the axis of rotation, in which groove a projection formed complementarily at the support portions positively engages to positively fix, i.e. to center the support portions vis-à-vis the support plate and, resp., the backing plate in the radial direction. The support portions can be positively connected to the support plate and/or the stiffening structure by the groove and the complementary projections so that the support plate and/or the stiffening structure significantly determine the directed thermal expansion in the radial direction. Of preference, the groove is arranged radially as far outwards as possible so that a radial distance on the side of the support portions between the groove and, resp., the projection and the cutting edges is preferably minimized.

According to another aspect of the invention, the support plate may also include a projection or an elevation, for example in the form of a key so as to realize form closure with the other tool components such as the chucking portion and/or the support portions.

Preferably, the support structure may be configured as a hollow construction or a cage construction. The hollow construction includes the support plate and the backing plate offset in the axial direction and fastened to the end face, wherein between said two plates and between the support portions two further lateral plates are inserted so that a hollow chamber is formed between all of the plates (and the support portions). Hence, a type of hollow cube is formed together with the support portions. This offers the advantage that a resistance moment and, resp., a stiffness of the rotary tool is optimally exploited while the mass is minimal, vibrations are efficiently damped and, in addition, chips are kept out of the inner volume. The rotary tool is easy to clean. In the cage construction, especially the backing plate and/or the lateral plates and/or the support plate may include a lattice structure instead of a plate-shaped structure so that further weight is reduced and handling of the rotary tool is even enhanced.

For transmitting a high torque from the chucking portion to the support plate preferably the chucking portion may be positively connected to the support plate or, resp., a positive inclusion may be provided between especially the flange of the chucking portion and the support plate.

In particular, the support plate may have, on the side facing away from the cutting edges, a straight groove orthogonal to the axis of rotation, especially a triangular groove in which a complementary projection of the chucking portion is positively engaged, with the groove being aligned so that it is located symmetrically between the two support portions. The groove serves for transmitting the torque by means of form closure from the chucking portion to the support plate.

Preferably, the flange of the chucking portion may include a recess in which an elevation or a projection of the support structure, especially of the support plate, is positively engaged so as to transmit especially a torque.

According to another aspect of the invention, the support structure, especially the support plate, may include preferably linear formed guiding grooves, especially in the form of a linear triangular groove and/or guiding elevations, especially in the form of a key. Another tool component engages positively in said guiding groove and, resp., guiding elevation so that, in the case of thermal expansion, the support structure and, resp., the support plate predefines the direction of thermal expansion of the further tool components such as the chucking portion.

In this context, it is emphasized that the rotary tool comprising the features of claim 9 and, where appropriate, the developing features according to at least one of the claims 10 to 19 in conjunction with the preamble of claim 1 represents an independent invention for which separate protection is claimed and which is optionally intended to be rendered the subject matter of a separate application.

BRIEF DESCRIPTION OF THE DRAWINGS

In the following, the invention shall be illustrated in detail by way of preferred embodiments with the aid of figures, wherein.

The Figures are schematic and are only intended to serve for the comprehension of the invention. Like elements are provided with like reference numerals. The features of the different embodiments may be exchanged for each other.

DETAILED DESCRIPTION OF PREFERRED EMBODIMENTS

Figure 1:
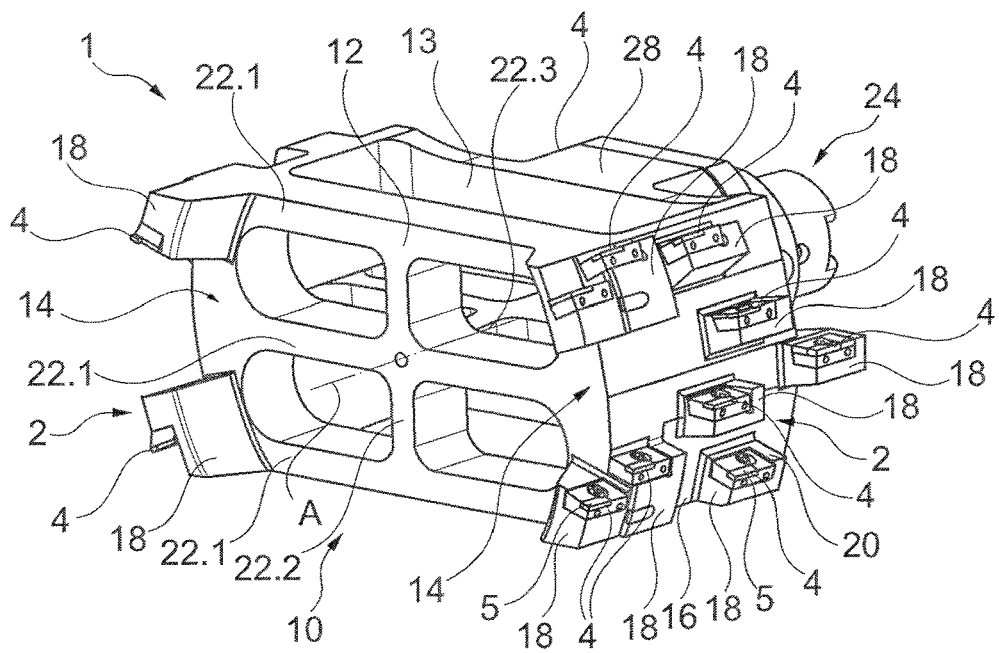
FIGS. 1 to 4 show different perspective views of a rotary tool according to the invention of a preferred embodiment.
Figure 2:
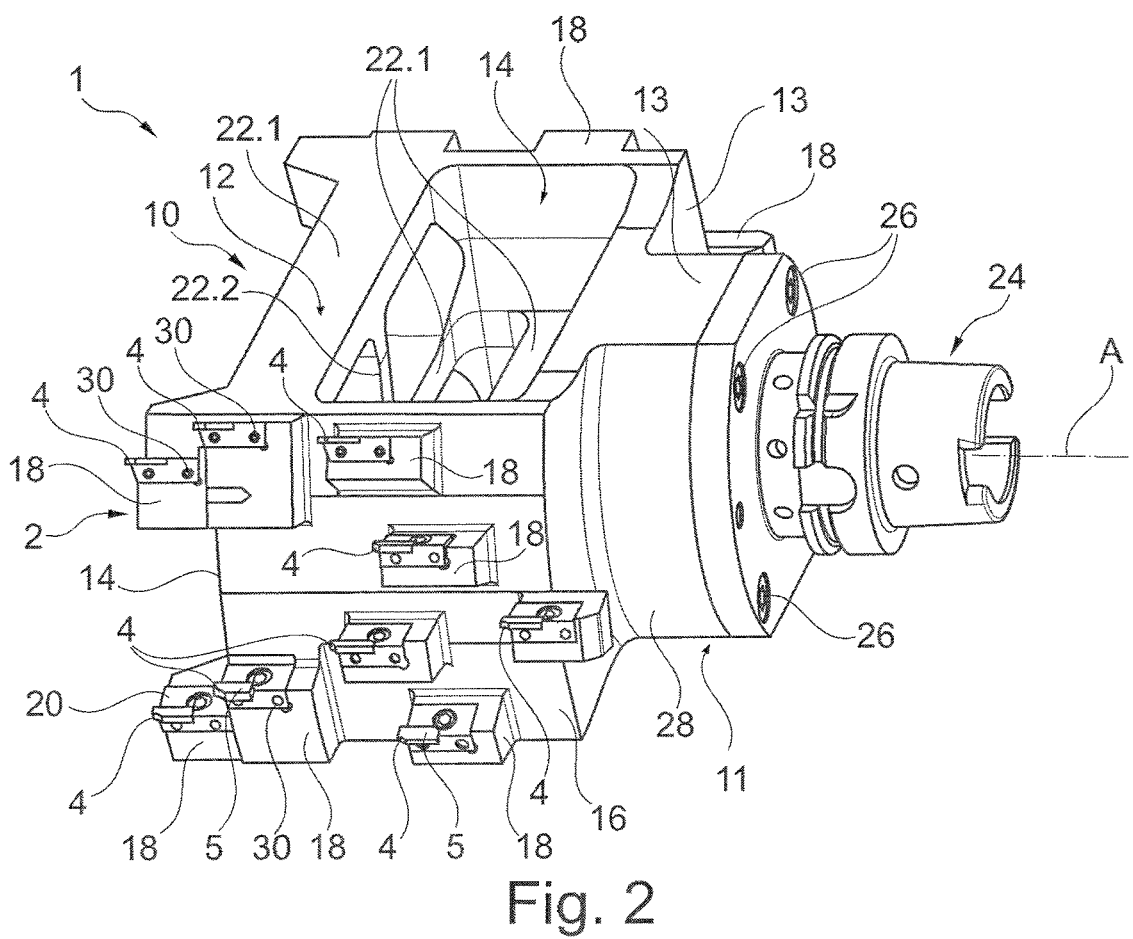
Figure 3:
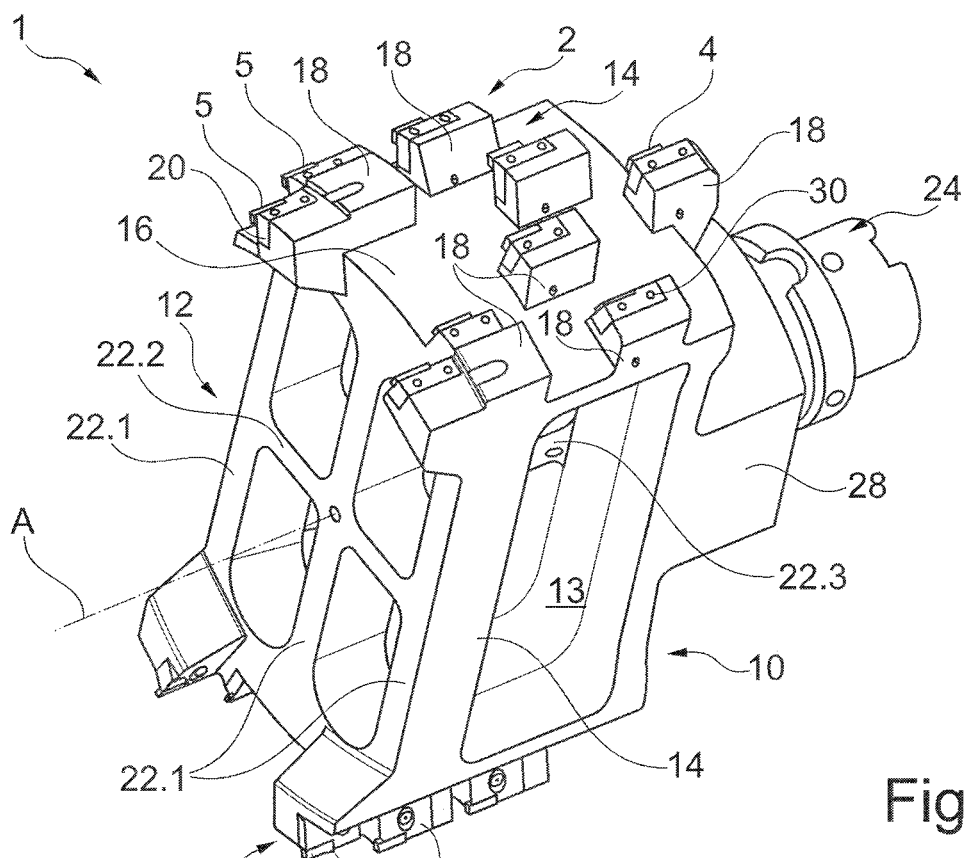
Figure 4:
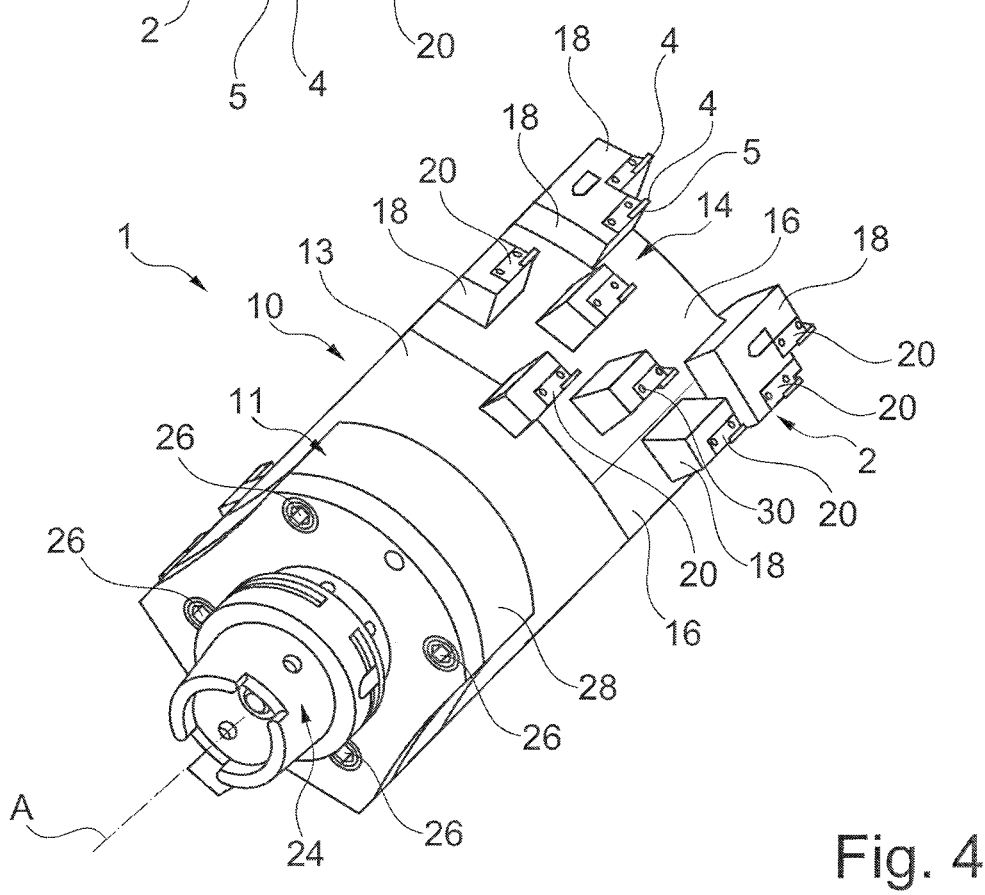

FIG. 1 to FIG. 4 illustrate in different perspective views a rotary tool 1 according to the invention of a preferred embodiment in the form of a stepped reamer. The rotationally driven rotary tool 1 is configured to be point-symmetric about an axis of rotation A and serves for high-precision machining of especially metallic components, components of plastics or components of fiber composite materials. For this purpose, at an outer circumference 2 of the rotary tool 1 cutting edges 4 are located which during rotation of the rotary tool 1 about the axis of rotation A remove chips of material from a workpiece to be machined (not shown). The cutting edges 4 are configured in the form of an edge in parallel to the axis of rotation A at a cutting member 5. During rotation about the axis of rotation A, each of radially outer points of the cutting edges 4 at the outer circumference 2 describes a circular cutting circle 6 having a related cutting circle diameter 8 (see the exemplary cutting circle 6 of a selected cutting blade 4 in FIG. 6 in this respect). Said cutting circle diameter 8 finally determines the resulting inside diameter of the workpiece to be machined at the position of the cutting edge 4.

The rotary tool 1 is designed for large inside diameters, for example for the inside diameter of a stator housing. In this embodiment, the rotary tool 1 has a cutting circle diameter 8 of up to 300 mm. Equally, the rotary tool 1 is adapted to machine an inside diameter having an axial length of up to 400 mm. The rotary tool 1 designed for this purpose can provide the required high machining performance and yet observe the required narrow manufacturing tolerances as explained below.

The rotary tool 1 includes a support structure 10 supporting the cutting members 5 and thus (indirectly) the cutting edges 4. The rotary tool 1 also includes at a rear end (see FIG. 2, right-hand area) a chucking portion 24. The chucking portion is a separate component and is rotationally and axially fixed to the support structure 10 via a coupling portion 11. The chucking portion 24 serves for chucking the rotary tool 1 in an appropriate tool holder (not shown) which positions and rotates the rotary tool for cutting. The chucking portion may take such shape that it may be coupled to a spindle of a machine tool via common tool holders. In the specific case, the chucking portion 24 is a so-called HSK interface (hollow shank cone interface) which is designed for internal coolant/lubricant supply.

According to the invention, the support structure 10 widens in an umbrella-type or jaw-type manner starting from the coupling portion 11 which is adjacent to the chucking portion 24. The umbrella-type or jaw-type design of the support structure 10 helps to properly transmit a torque from the chucking portion 24 to the support structure 10. Also, the rotary tool 1 can be manufactured at low cost in light-weight construction.

In particular, the support structure 10 has two support portions/self-supporting areas 14 which support the cutting edges 4 and, resp., on which the cutting edges 4 indirectly rest, and has a rear wall 13 in a plane orthogonal to the axis of rotation A which expands the support structure 10 toward the support portions 14 starting from the coupling portion 11 which is adjacent to the chucking portion 24. The wall 13 connects the two rear edges of the support portions 14 to each other and transmits a torque applied to the wall 13 to the support portions 14. Radially inside the support structure 10 and, resp., radially inside the support portions 14, the rotary tool 1 and, resp., the support structure 10 include a stiffening structure 12 in the form of a tension-compression strut frame. While the two support portions 14 mainly fulfil the function of cutting, the stiffening portion 12 backs the support portion 14 regarding stability as well as stiffening and ensures the forces occurring during cutting to be absorbed.

The umbrella-type support structure 10 and the stiffening structure 12 are manufactured by means of additive manufacturing. Specifically, the support structure 10 and the stiffening structure 12 are metal laser-sintered or selectively laser-sintered or selectively laser-melted (DMSL/SLM) and are made from the material Ti6Al4V. Alternatively to this embodiment, the stiffening structure 12 may be generatively manufactured from Invar and the support portions 14 may be generatively manufactured from Ti6Al4V, of course. Alternatively, the entire support structure 10 and the stiffening structure 12 may be metal laser sintered from the Invar material, of course. Likewise, the support structure 10 may also contain silicon-nitride (Si3N4). Titanium Ti6Al4V (material number 3.7165) is a titanium alloy having very low specific weight and excellent corrosion resistance. The mean thermal expansion coefficient is below 10E-6 1/K even in the range from 20° C. to 650° C. and thus ensures dimensional stability of the rotary tool 1. Due to the low specific weight of barely 4.4 g/cm^3 in conjunction with the configuration of the stiffening structure 12 as a tension-compression strut frame, the rotary tool 1 is made in light-weight construction and is yet adapted to the mechanical loads occurring. Due to the accompanying low weight, proper handling and thus compliance with the dimensional stability can be ensured.

In this embodiment, the support structure 10 includes two support portions 14 diametrically opposed with respect to the axis of rotation A which are substantially in the form of an annular portion or partially cylindrical portion about the axis of rotation A. The support portion 14 includes plural block-shaped projections/blocks 18 in the radial direction on a planar partially cylindrical surface 16. In this embodiment, the support structure 10 has nine block-shaped projections 18 for each support portion 14. The block-shaped projections 18 are offset both in the axial direction and at an angle vis-à-vis the axis of rotation A. In each of said block-shaped projections 18 a cartridge 20 is embedded which retains the cutting member 5 in the form of a cutting insert. The cartridge 20 can be axially and radially adjusted so that, indirectly via the cartridge 20, also the cutting member 5, and thus the cutting edge 4, is axially and radially adjustable. The cutting member 5 moreover includes a specific coating for improved hardness and long service life. The cartridges 20 are supported by the block-shaped projections 18 both in the radial direction and in the axial direction.

When viewed in the axial direction, the rotary tool 1 has five portions each of which includes at least one block-shaped projection 18 of the support portions 14 with embedded cartridge 20 and cutting edge 4, said portions being partially overlapping. Said five portions form so-called cutting steps 19 (see also FIG. 5). Each of the cutting steps 19 has a cutting edge 4 with a related cutting circle diameter 8, wherein the cutting circle diameters 8 of all cutting steps 19 are different from each other and increase from a front side of the rotary tool 1 (left side in FIG. 5) in the axial direction to a rear side of the rotary tool 1, viz. to the chucking portion 24. The individual cutting steps 19 figuratively may be considered to be disks of the rotary tool 1 which are partially overlapping and are increasing in diameter toward the chucking portion 24 of the rotary tool. The first or foremost cutting step 19 is in the form of the block-shaped projection 18 of the support portions 14 both in the axial and in the radial directions. In this embodiment, each of the first through fourth cutting steps 19 (numbered from the front side to the rear side of the rotary tool 1) includes two cutting edges 4 and the fifth cutting step 19 includes exactly one cutting edge 4 for each support portion 14.

The two support portions 14 are interconnected via the stiffening structure 12. Concretely speaking, the stiffening structure 12 has a plurality of struts 22 forming a tension-compression strut frame. The stiffening structure 12 includes three connecting struts 22.1 which interconnect the two support portions 14 at the front side of the rotary tool 1. The three connecting struts 22.1 are located in a plane orthogonal to the axis of rotation A and extend in parallel to each other. The central connecting strut 22.1 intersects the axis of rotation A.

The connecting struts 22.1 in this embodiment have a box-shaped design of rectangular cross-section which transmits a tensile/compressive force of the one support portion 14 to the diametrically opposed support portion 14 and in this way stiffens the support structure 10 in the radial direction.

Apart from the connecting struts 22.1, the stiffening structure 12 includes a stiffening strut 22.2 which, although being equally located in the plane orthogonal to the axis of rotation A, extends perpendicularly to and intersects the connecting struts 22.1. The stiffening strut 22.2 serves for fixing and stiffening the parallel arrangement of the connecting struts 22.1. When viewed in the axial direction, the three connecting struts 22.1 and the one stiffening strut 22.2 form a lattice structure having equal axial coordinates. The lattice structure is optimized for tensile/compressive forces in directions orthogonal to the axis of rotation A. The corner edges of the lattice structure and, resp., the edges of the lattice holes in the axial direction have inner sphericities or chamfers to reduce stress peaks and to uniformly transmit forces to the support portions 14.

The stiffening structure 12 further includes an axial strut 22.3 extending coaxially to the axis of rotation A. Said axial strut 22.3 serves for stiffening in the axial direction and reduces the risk of "bending" of the lattice structure in the axial direction. A side opposed to the lattice structure, when viewed in the axial direction, is configured in the form of the wall 13.

When viewed in the axial direction, the stiffening structure 12 includes, centrally between the lattice structure and the wall 13, another connecting strut 22.1 which intersects the axis of rotation A and connects the two support portions 14. Said connecting strut 22.1 serves for radially backing and stiffening a central area of the support portions 14.

The chucking portion 24 of the rotary tool 1 is tightly connected via four screws 26 in the axial direction to the wall 13 and, resp., to a block shoulder 28 of the wall 13. The block shoulder 28 provides the required material for female threads into which the screws 26 are screwed. The block shoulder 28 thus constitutes the coupling portion 11 of the rotary tool.

The rotary tool 1 is internally cooled and, for this purpose, includes passages 30 extending from the chucking portion 24 for a fluid. The passages 30 convey coolant/lubricant to the cutting edges 4.

Figure 5:
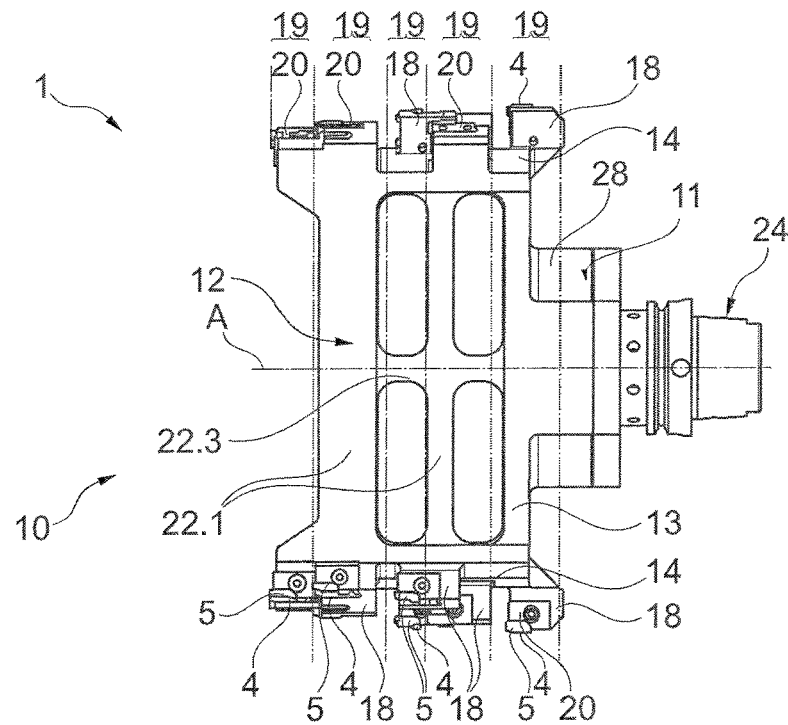
FIG. 5 shows a lateral view of the rotary tool of the preferred embodiment.

FIG. 5 illustrates a lateral view of the rotary tool 1 according to the invention. In this lateral view, the five cutting steps 19 stringed together in the axial direction are clearly evident which have a cutting circle diameter 8 of their respective cutting edges 4 increasing toward the chucking portion 24 and are partly overlapping. Likewise, the central connecting strut 22.1 and the axial strut 22.3 which form a second latticed structure in a lateral view are clearly evident. The stiffening structure 12 of the rotary tool 1 has a latticed structure when viewed both in the axial direction and in a lateral view. Said two latticed structures are normal to each other and so-to-speak form a T section in the radially inner area of the support structure 10. The stiffening structure 12 forms, together with the wall 13 of the support structure 10, an I-section or a double-T beam (double-T section) which is designed in light-weight construction due to the latticed structure and the material used in combination with the generative manufacturing method and provides an optimized geometry for backing and stiffening the support portions 14 in the radial direction.

Figure 6:
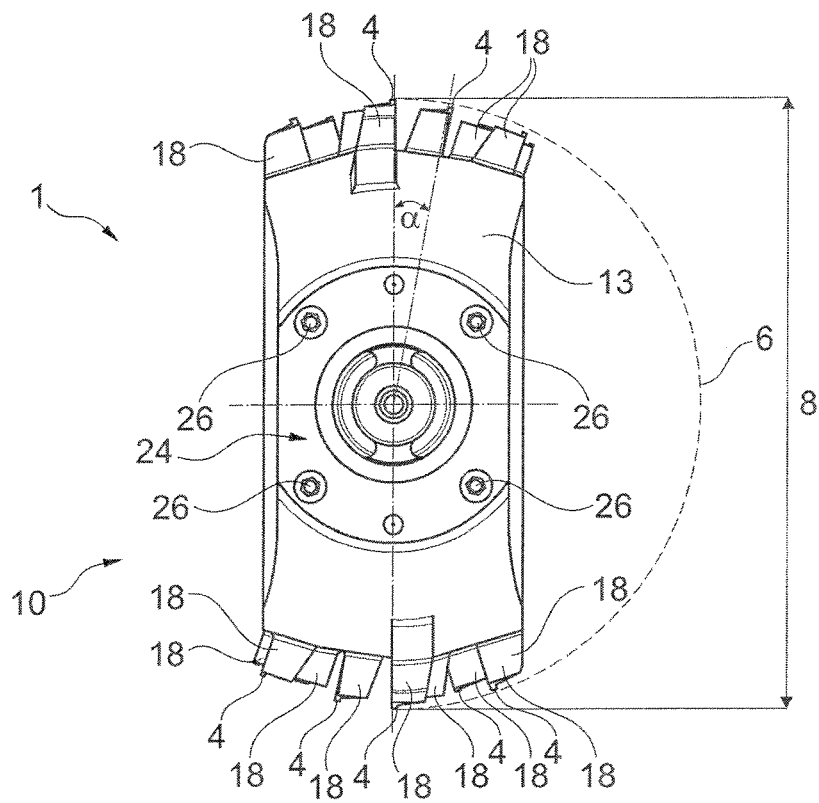
FIG. 6 shows a rear view of the rotary tool of the preferred embodiment.

FIG. 6 illustrates a rear view of the rotary tool 1. In this view, too, the different cutting circle diameters 8 of the five different cutting steps 19 as well as angles of the cutting edges 4 about the axis of rotation A relative to each other are evident. In FIG. 6 an angle α of a cutting edge 4 with a different cutting edge 4 of a different cutting step 19 is exemplified. In the rear view, the support structure 10 is substantially rectangular, other than in common rotary tools, wherein the two radially outer sides and, resp., the surfaces 16 of the support portions 14 are not linear but in pitch circle shape. The straight sides permit proper handling as well as stacking or lining-up of the rotary tool 1. In this way, proper storability and transportability is achieved.

Figure 7:
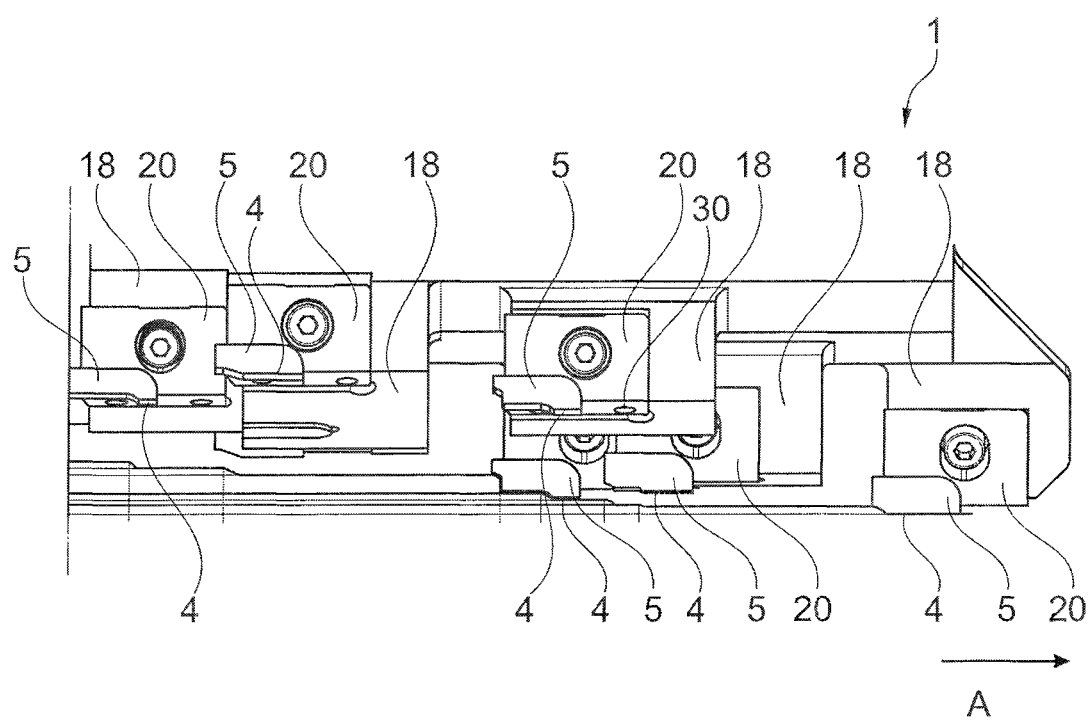
FIG. 7 shows a detailed top view onto a partial area of the rotary tool of the preferred embodiment.

FIG. 7 shows a detailed top view onto a partial area of the support portion 14. This view illustrates the radially and axially adjustable cartridges 20 which retain the cutting members 5 with the cutting edges 4. Each of the cutting edges 4 has a different dimension in the axial direction. The cutting material used is polycrystalline diamond (PCD) which is sintered onto the cutting member 5 in the form of the cutting insert having a carbide base. The polycrystalline diamond is an extremely hard intergrown mass, thus causing the cutting edge 4 to be optimized for the cutting of hard workpieces.

As a matter of course, also modifications of the afore-described embodiment are possible without leaving the basic idea of the invention.

For example, instead of the generative manufacturing also a different manufacturing method may be applied, of course. Also, the support structure can be impressed onto the chucking portion.

For example, the stiffening structure may also be designed as tetrahedral tension-compression strut frame. The struts need not be normal to each other but may as well enclose an angle not equal to 90° to form the tension-compression strut frame.

Figure 8:
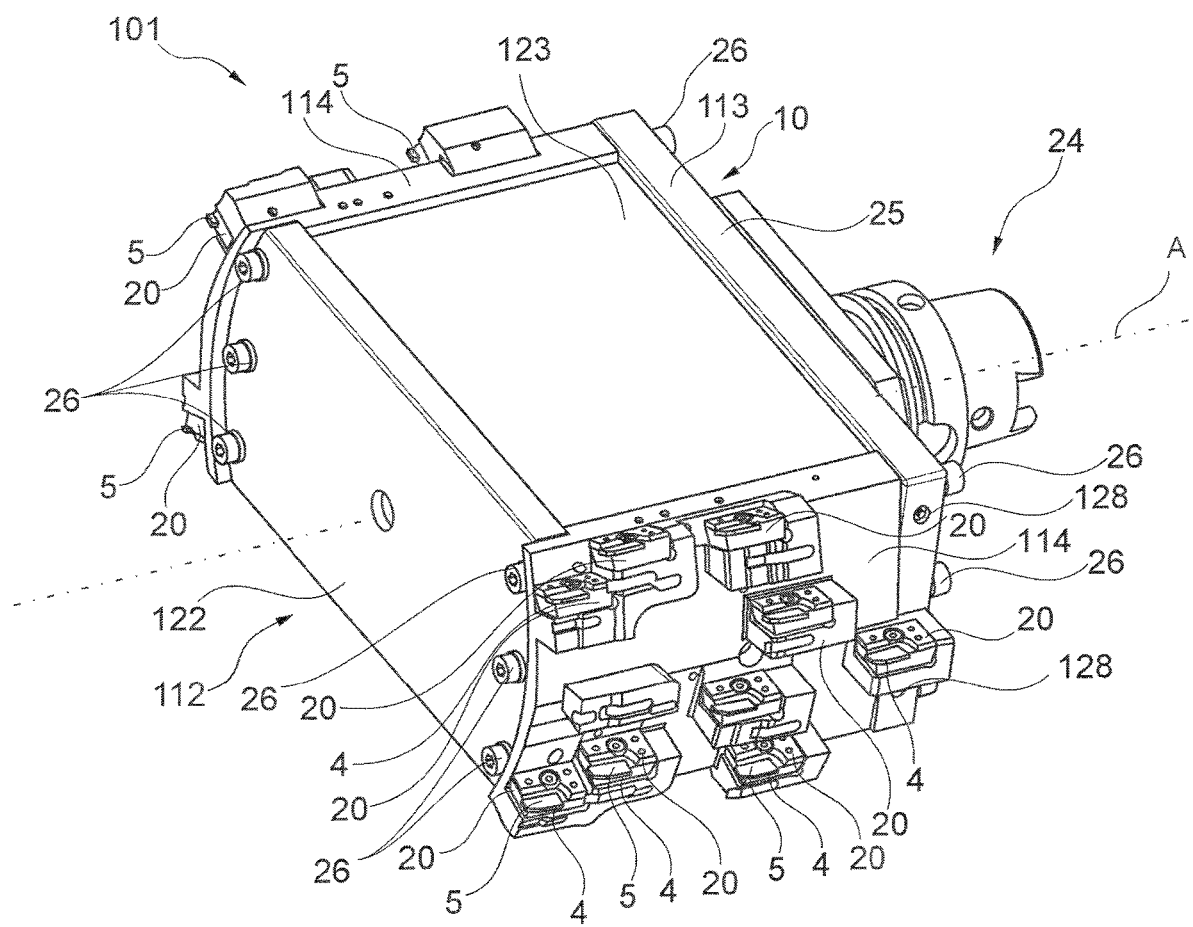
FIG. 8 shows a perspective view of a rotary tool according to the invention of another second preferred embodiment in hollow construction.

FIG. 8 illustrates a rotary tool 101 according to the invention in the form of a stepped reamer in accordance with another second preferred embodiment. The rotary tool 101 is designed in hollow construction and, unlike the first embodiment, is not formed integrally but modularly from different interconnected tool components. The support structure 110 concretely includes three different separately formed portions, with the chucking portion 24 again serving for introducing the torque in the configuration of a hollow shank cone seat. A rectangular support plate 113 connected in a rotationally and axially fixed manner to the chucking portion 24, more exactly speaking to a flange 25 of the chucking portion 24, serves as one of the tool components for transmitting the torque to the radially outer support portions/cutting supports 114, wherein the support portion 114 including the cutting edges 4 finally serves for cutting. Thus, the tree areas fulfill different functions. The modular design allows all of the three areas to be optimally adapted to their respective function and especially to be designed with respect to dimensional stability and costs.

The support plate 113 includes fiber-reinforced plastic composite including carbon fibers as fiber component and vinyl ester resin as matrix component, wherein it is designed as a layer composite comprising fibers oriented in the radial plane but otherwise arranged at random. In other words, the fibers of the fiber-reinforced plastic composite are embedded randomly in the matrix system in a two-dimensional plane so that a two-dimensional isotropic material property of the fiber-reinforced plastic composite is obtained. The support plate 113 is orthogonal to the axis of rotation A and the axis of rotation forms the center of the support plate 113 so that the support plate 113 includes the plane of the fibers in a direction transversely to the axis of rotation A. Since the carbon fibers have a slightly negative thermal expansion coefficient, finally the fiber-reinforced plastic composite in total has a thermal expansion coefficient of less than 5 ppm/K (5E-6 1/K) in the plane transversely to the axis of rotation A. The geometric arrangement of the support plate 113 transversely to the axis of rotation A in combination with the arrangement of the fibers helps to safeguard proper dimensional stability of the rotary tool 101 even in cutting operation of the tool with increased reaming energy input and, correspondingly, considerably increasing or varying temperature of the support structure 110. At least a portion of the support plate 113 may be considered to be the coupling portion.

As an alternative or in addition, in the fiber-reinforced plastic composite also PBO fibers may be embedded. The PBO fibers are currently offered solely by Toyobo Co., LTD. with the designations ZYLON® AS and ZYLON® HM. The (high-modulus) PBO fiber with the designation ZYLON® HM is especially suited for being selected as fiber component and in this application is generally defined as the term PBO fiber. In other words, the terms PBO fiber and ZYLON® HM are synonymous in the present application.

The data sheet concerning the PBO fibers titled "PBO FIBER ZYLON®" with the add-on "Technical Information (Revised 2005.6)" in the form of an 18 pages PDF file was retrieved at the end of 2018 under http://www.toyobo-global.com/seihin/kc/pbo/zylon-p/bussei-p/technical.pdf. In item "1. Basic Properties" the most important properties of the PBO fibers are listed:

There are two types of PBO fibers, AS (as spun) and HM (high modulus).

|  | ZYLON ® AS | ZYLON ® HM |
|---|---|---|
| Filament decitex | 1.7 | 1.7 |
| Density (g/cm^3) | 1.54 | 1.56 |
| Tensile strength (cN/dtex) | 37 | 37 |
| (GPa) | 5.8 | 5.8 |
| (kg/mm^2) | 590 | 590 |
| Tensile modulus (cN/dtex) | 1150 | 1720 |
| (GPa) | 180 | 270 |
| (kg/mm^2) | 18000 | 28000 |
| Elongation at break (%) | 3.5 | 2.5 |
| Moisture absorption (%) | 2.0 | 0.6 |
| Decomposition temperature (° C.) | 650 | 650 |
| LOI | 68 | 68 |
| Thermal expansion coefficient | — | $-6 \times 10^{-6}$ |

Preferably, the tool component of the rotary tool according to the method described below may be manufactured as a preferred embodiment of the method.

In a first step of the method, for a fiber-reinforced plastic composite PBO fibers (ZXLON® HM) and/or carbon fibers, for example, are selected as fibers or fiber component as well as, for example, epoxy resin and/or vinyl ester resin are selected as thermosetting matrix component of a matrix system. After that, the method proceeds to a step in which the matrix system is provided. The matrix system includes preferably epoxy resin and/or vinyl ester resin as a (thermosetting) matrix component. The matrix system may include only epoxy resin as thermosetting matrix component or else further matrix components such as vinyl ester resin or unsaturated polyester resins.

The step of providing the matrix system preferably comprises a step of providing a carrier film as well as a step in which the non-cured matrix system is applied to the carrier film.

Said step is followed by the step of arranging the fibers with a length distribution adapted to the field of application. This step of arranging preferably comprises the following sub-steps: at first in a (first sub-) step at least one fiber roving of the selected fibers having circular or elliptic cross-section is provided. A (fiber) roving is understood to be a bundle of parallel fibers in the form of endless fibers. The fiber roving may preferably have 1000 (1 k), 3000 (3 k), 6000 (6 k), 12000 (12 k), 24000 (24 k) or 50000 (50 k) of the parallel fibers. In order to ensure a uniform configuration of the material properties, the number of the parallel fibers in the fiber roving preferably ranges from 1000 (1 k) to 12000 (12 k). The fiber roving is preferably unwound from a spool. Said fiber roving is then reformed in one step into a preferably flat strip-shaped fiber roving so as to achieve, as described hereinafter, an as good fiber matrix adhesion as possible without any disadvantageous hollows. For example, the fiber roving may be guided over extending devices and deflecting rollers and fanned out as broadly as possible. So that no endless fibers are obtained, in a subsequent step preferably the flat strip-shaped fiber roving is cut into fiber chips of predetermined length distribution. The term length distribution in this context denotes the pro-rata distribution of the present lengths of the fibers in which the fibers may be provided in equal length (share of the single length in the length distribution amounts to 100%; one single "peak") or in different length (cut to length) (at least two different lengths having respective shares of less than 100%). It can be stated that the length distribution is a function over the length whose value reflects the share of the length, with the sum of the shares amounting to 100%. In the case that the fibers have different lengths, the length distribution may have, for example, exactly two or more defined different lengths of the fibers. Also, the length distribution may be a normal distribution of the length of the fibers about a maximum of a particular length. Said fiber chips form a fiber mixture together with optionally further fibers. The fiber mixture may include, apart from the fiber chips, further fibers such as carbon fibers. The fiber mixture may include especially only the plurality of fiber chips of one single predetermined length.

In a subsequent step, the fiber mixture including the fiber chips then is finally added to the matrix system. This is preferably carried out in a defined manner by a step of sprinkling the fiber mixture comprising the fiber chips in an amount adapted to the field of application onto a matrix layer of the matrix system. In this way, a fiber layer comprising (at least) the fiber chips is formed which rests on the matrix layer of the matrix system and, where appropriate, protrudes into and penetrates the latter. By the amount adapted to the field of application also a volume proportion of the fibers in the fiber-reinforced plastic composite may be adjusted.

In order to embed the fibers and, resp., the fiber chips primarily completely in the matrix system, a step of applying another matrix layer of the matrix system to the fiber layer will follow. For manufacturing a semi-finished product which is properly manageable and which does not stick especially to system components during further processing, preferably in a subsequent step another carrier film is applied to the applied further matrix layer. In this way, a sandwich configuration is formed as the semi-finished product of carrier film, matrix layer, fiber layer, matrix layer and carrier layer in which the fiber layer is symmetrically inserted and especially embedded between the other layers. The matrix layers form the thermosetting plastic matrix 8.

The semi-finished product manufactured in this way is compacted and especially fulled in a subsequent step by means of a compacting unit. The manufactured semi-finished product can be handled, especially stored, transported, shaped to fit, especially trimmed to fit, torn or bent in this state. Further, preferably plural layers of the semi-finished product may be put on top of each other or layered, with the carrier films being removed between the respective layers.

After that, the compacted semi-finished product is supplied, after removing the carrier films, to a heatable (heat-pressing) mold, especially inserted into said mold which positively presses the semi-finished product and thus imparts its final shape to the same, heats and cures it by the press-heating operation so as to finally form the tool component in the configuration of a fiber-reinforced plastic composite molded component. At the high pressure and the high temperature initially the viscosity of the matrix system strongly decreases and allows (partial) flowing of the matrix system. In this state, the fibers are completely wetted by the matrix system and, resp., the fibers have direct contact with the matrix system preferably on all surfaces. Shortly afterwards, the matrix system reacts by simultaneously increasing its viscosity and cures.

In a last step of the method, ultimately the molded tool component is removed from the heatable mold and may be used in the rotary cutting tool 101, for example as the support plate 113 or as the backing plate 122.

At the end face of the rotary tool 101, a backing plate 122 arranged in parallel to the support plate 113 and transversely to the axis of rotation A and having a central through-hole is fastened as stiffening structure 112 to the two diametrically opposed support portions 114. Specifically, both the support plate 113 and the backing plate 122 are screwed in the axial direction to the support portions 114 by means of screws 26. The support plate 122 equally includes a fiber-reinforced plastic composite as a material in which carbon fibers are embedded as fiber components in the matrix system. The support plate 122 again fulfils only "secondary functions" and is arranged outside a torque transmission train. Therefore, it can be appropriately adapted to the requirements concerning mass reduction and/or vibration damping.

Between the support plate 113, the backing plate 122 and between the support portions 114, moreover two lateral plates 123 are enclosed and held framed by the same. The lateral plates 123 are symmetrically offset against the axis of rotation A and extend substantially from the side of the support plate 113 to the side of the backing plate 122. In addition, the two lateral plates 123 extend from a circumferentially outer side of the support portion 114 to the circumferentially outer side of the opposite support portion 114. The support plate 113, the backing plate 122, the lateral plates 123 and the support portions 114 together form a substantially box-shaped hollow member or hollow chamber. This construction provides, while minimizing the mass, for a high resistance moment and, resp., increased stiffness of the rotary tool 101, with the additional advantage of chips being prevented from getting caught inside the tool. The backing plate 122 just as the lateral plate 123 may be relatively thin-walled.

The material of both the support plate 113 and the backing plate 122 and of the lateral plates 123 is fiber-reinforced plastic composite comprising carbon fibers and/or PBO fibers. All of these plates 113, 122, 123 have in common that they extend orthogonally to the axis of rotation A and substantially connect the two support portions 114 to each other in the radial direction and, resp., in the direction transversely to the axis of rotation A. Due to the fact that the material of the plates 113, 122, 123 is fiber-reinforced plastic composite, and with the support portions 114 being configured and arranged in circular segment shape, the cutting edges 4 are moving only minimally even with a considerable temperature load in the area of the tool, which allows the dimensional stability of the tool to be observed and the rotary tool nevertheless to be properly handled. Even in the case of significant increase in temperature of the tool, it can be safeguarded that the cutting edges 4 embedded at room temperature remain dimensionally stable even during cutting operation and the tool can be properly handled due to the light-weight design. In this way, also a small diameter of the chucking portion 24 and a small diameter of the hollow shank cone and, thus, of a related spindle can be obtained.

Figure 9:
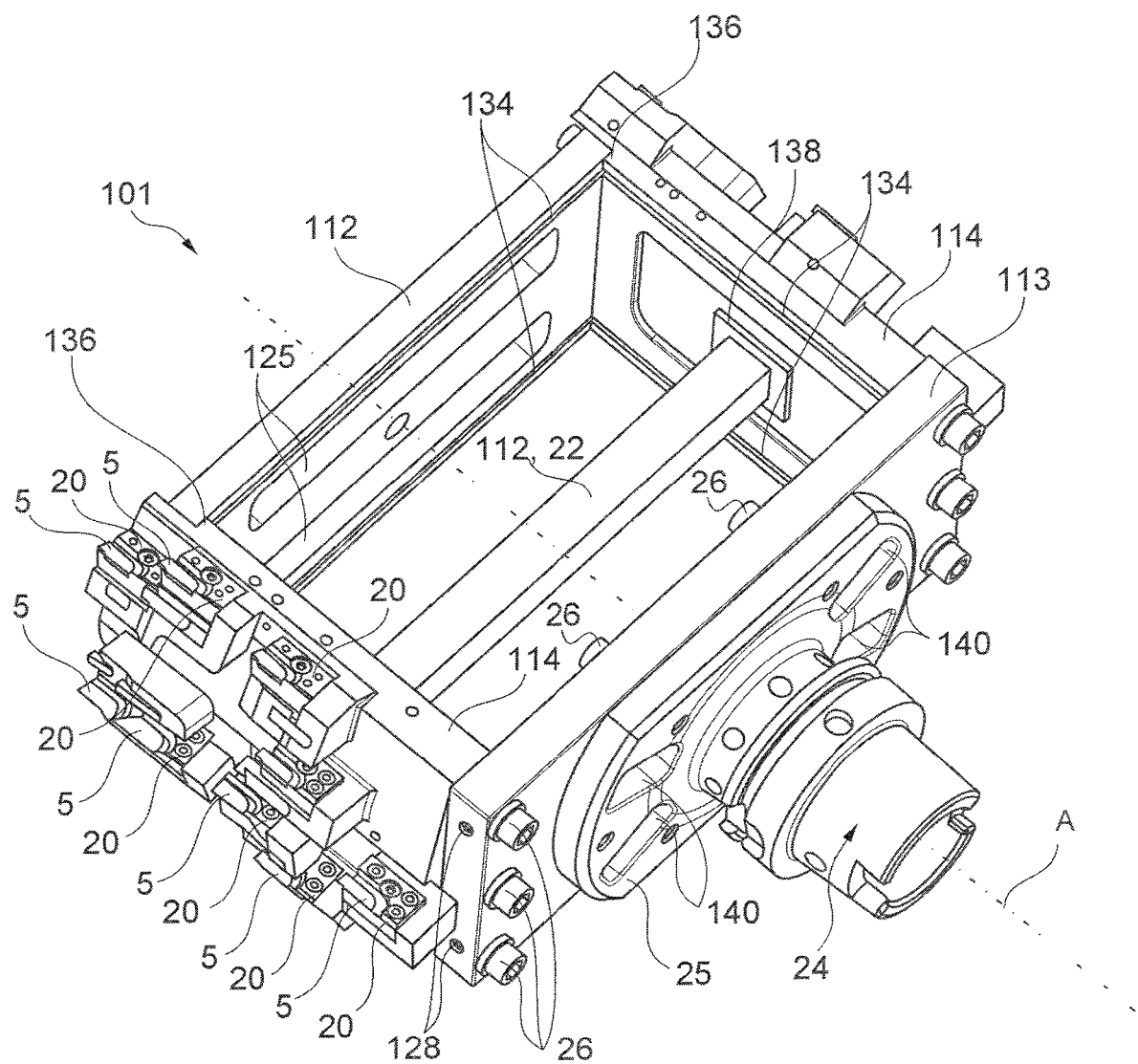
FIGS. 9 to 13 show different perspective views of the rotary tool according to the invention of the second preferred embodiment, with the side plates being removed.
Figure 10:
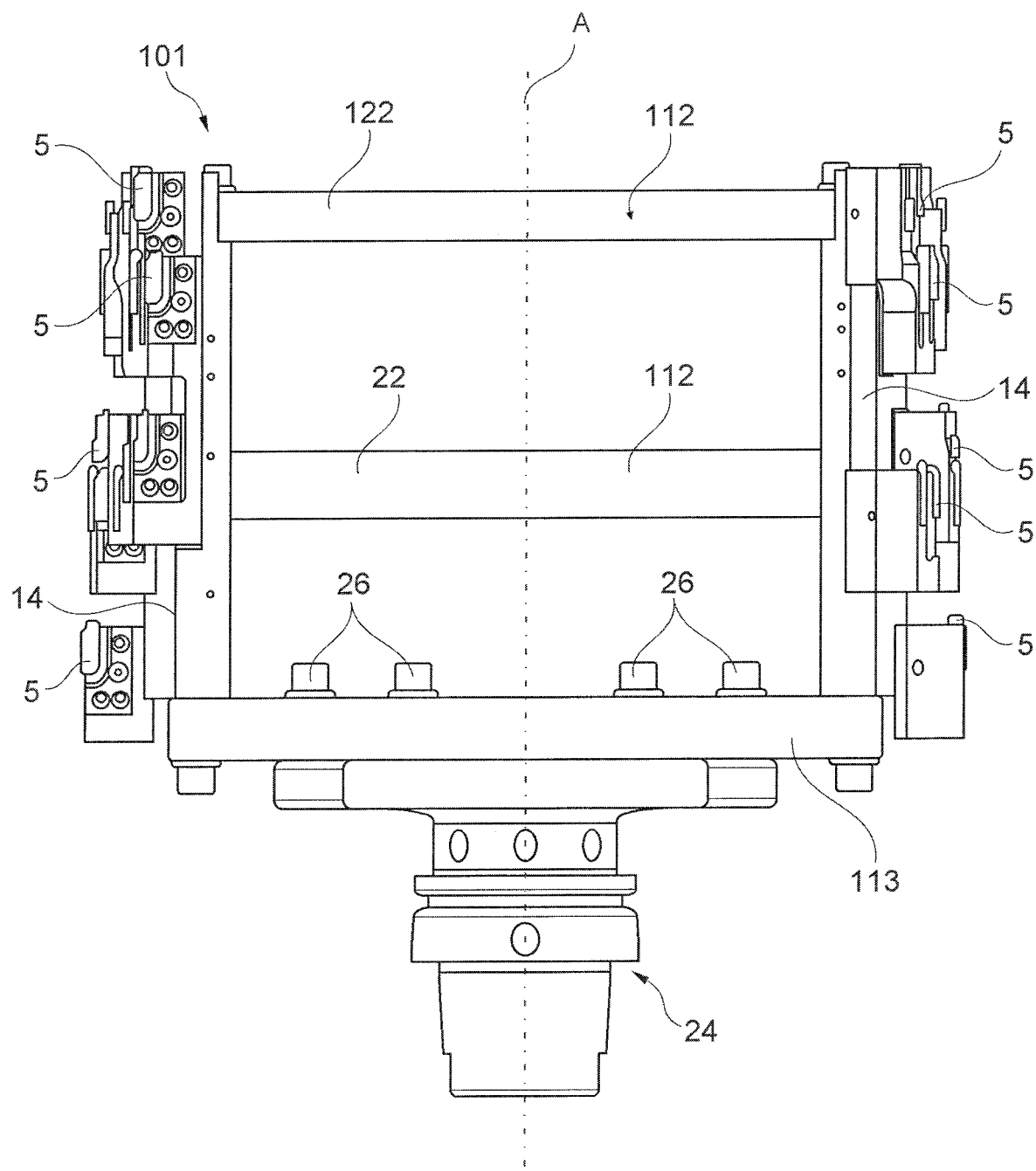
Figure 11:
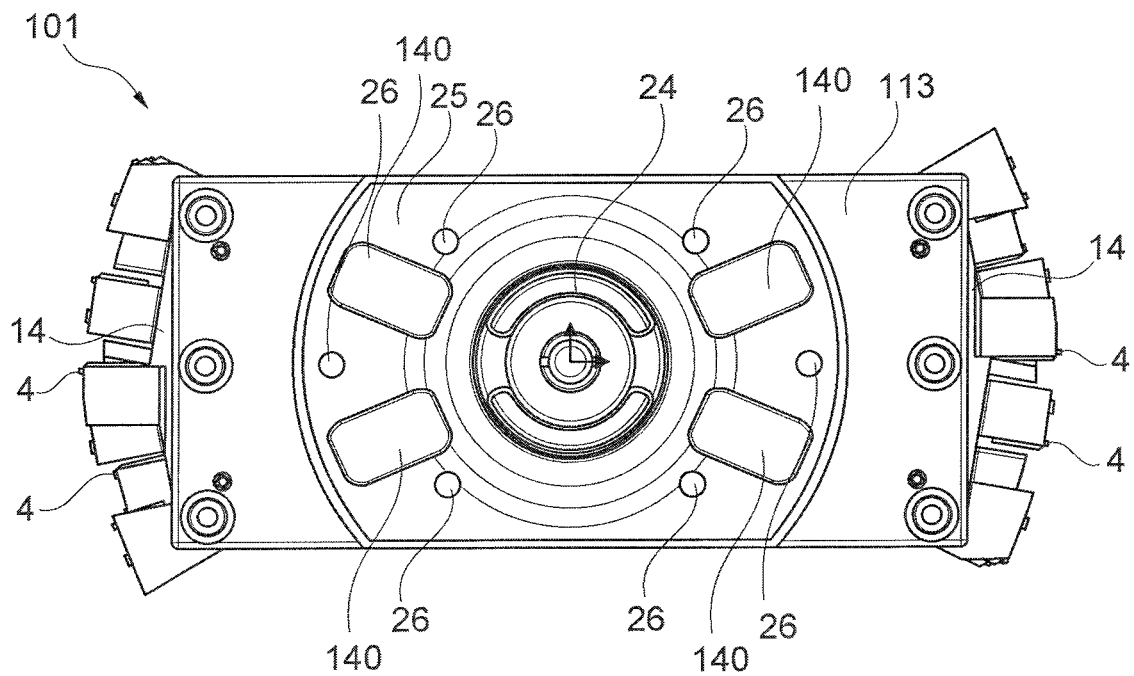
Figure 12:
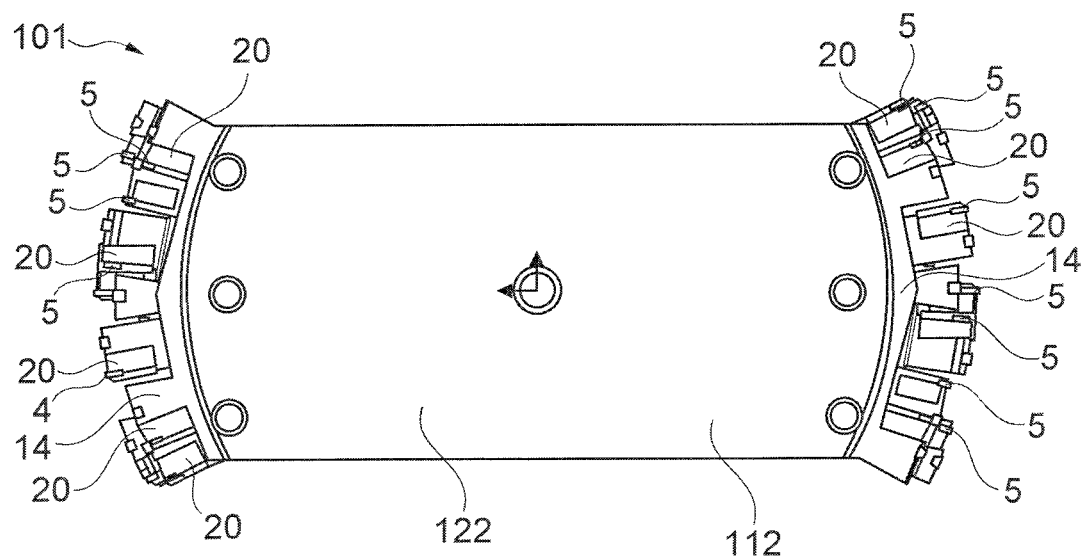
Figure 13:
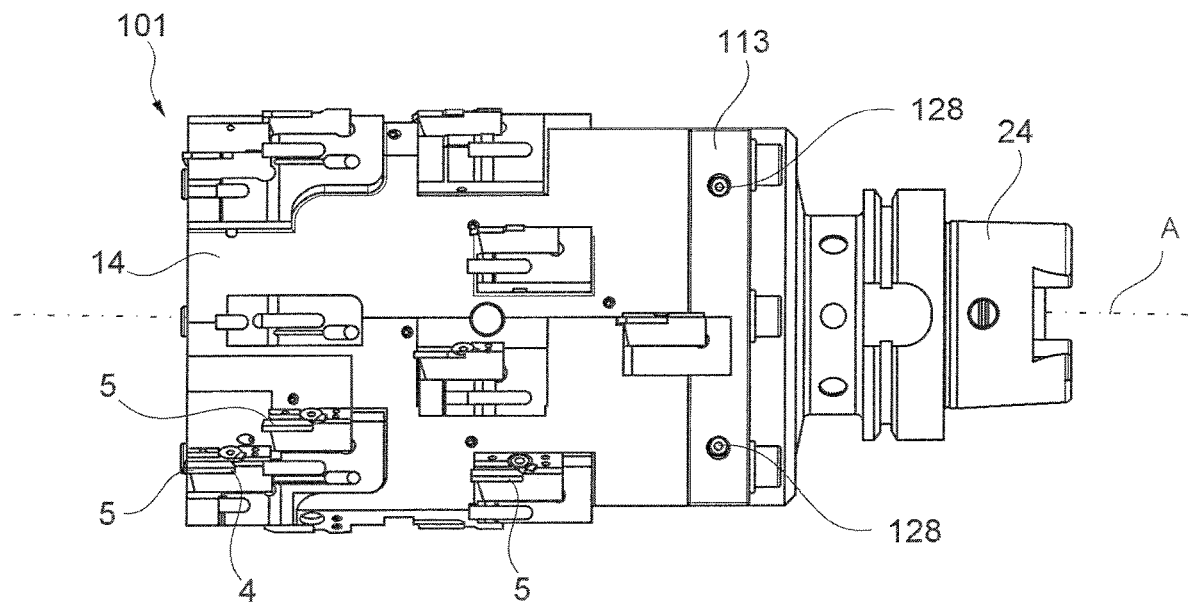

The FIGS. 9 to 13 illustrate the rotary tool 101 according to the invention of the second preferred embodiment in detail, wherein the lateral plates 123 are removed for better illustration and FIG. 10 is a top view, FIG. 11 is a rear view, FIG. 12 is a front view and FIG. 13 is a lateral view of the rotary tool 101 according to the second preferred embodiment. The lateral plate 123 can be removed as well as inserted by unscrewing the backing plate 122 and removing it from the end face of the rotary tool 101 and, after that, the lateral plate 1232 being pushed out of the no longer completely peripheral groove 134 in the axial direction toward the end face of the rotary tool and, resp., being inserted again in the opposite direction into the (partially peripheral) groove 134. The lateral plates 123 thus are not fixedly connected to the support structure 110 and, resp., to the support portions 114 and the support plate 110 but are positively held by means of the backing plate 122 and the framing peripheral groove 134. In addition, the lateral plates 123 may be adhesively connected, especially bonded, of course.

In another alternative embodiment, which is not shown, the lateral plates need not be part of the rotary tool but an open rotary tool without any lateral plates may be configured. It is also possible that the lateral plates are not plate-shaped but are differently designed. For example, they may be lattice-shaped so that a rotary tool in cage design is formed.

It is evident from FIG. 9 that in the second preferred embodiment the backing plate 122 as a whole does not have a plate-shaped structure but that on the side facing the support plate 113 two recesses 125 in the form of two wide grooves are introduced to reduce a mass. In other words, although the backing plate 122 comprising the material of fiber-reinforced plastic composite, similarly to the first preferred embodiment, is not configured to be latticed but is configured in a weight-optimized manner to be partially latticed in a way having three diagonal struts 22 transversely to the axis of rotation A.

The rotary tool 101 additionally includes, axially offset and substantially in the axial direction centrally between a support plate 113 and the backing plate 122 and intersecting the axis of rotation A, another box-shaped central diagonal strut 22 which is equally made from fiber-reinforced plastic composite and connects the two support portions 114 to each other in the radial direction. All of the backing plate 122, the support plate 113 and the central diagonal strut 22 may share the same material of fiber-reinforced plastic composite, for example, or may include different fiber-reinforced plastic composites adapted to their respective function. The diagonal strut 22 serves for radial stiffening as well as for absorbing the radial forces and for vibration damping. The central diagonal strut 22 is fastened to a base 138 formed on the side of the support portion 114.

In order to positively fix the lateral plates 123 in their position, the backing plate 122, the support plate 113 as well as the support portions 114 include a continuous circumferential groove 134 in which the lateral plates 123 engage by a corresponding projection, thus being positively enclosed. For cooling the rotary tool 101 the support plate 113 moreover comprises cooling passages 128 extending radially outwardly from a central inlet 130 located on the side of the chucking portion 24. Thus, coolant or cooling lubricant can be introduced through the chucking portion 24 and can be fed to the cutting edges 4. On the one hand, the support plate 113 includes the cooling passages 128 which guide the coolant radially outwardly, with a directional deflection in the axial direction being incorporated in the support plate 113 so as to guide the coolant passages 128 including the coolant into the support portions 114 and to feed the same as closely as possible to the cutting edges 4. For this purpose, the coolant passages 128 are sealed at their radially outer ends, especially by means of a sealing set screw which engages in a thread formed in the support plate 113. Radially further inwards than the set screw, the coolant passage 128 includes a bore in the axial direction for establishing a fluid communication with the support portions 114 and conveying coolant or cooling lubricant into the support portions 114. The support portions 114 have a fluid branching system (not shown) inside or within the component per se for conveying the coolant so as to provide the coolant preferably directly at the cutting edges 4. To this end, the branching system may include, especially for each cutting edge 4, a respective passage leading to the cutting edge 4 and, resp., to the area of the cutting edge 4. The backing plate 122 is enclosed in the radial direction by the support portions 114 and abuts on a stop 136 in the axial direction at the support portions 114 for positioning. In other words, the support portions 114 are located radially outside the backing plate 122.

The chucking portion 24, more exactly speaking the flange 25 of the chucking portion 24, is connected to the support plate 113 by means of screws 26 in an axially and rotationally fixed manner. The flange 25 in addition has four elongate recesses 140, wherein material is removed from the flange 25 in the axial direction. Two recesses 140 at a time extend from the axis of rotation A radially outwardly to each side of the support portions 114. Said recesses 140 on the one hand serve for weight reduction, but, on the other hand, may as well positively engage in optionally formed corresponding elevations or projections in the axial direction of the support structure 110 and, resp., of the support plate 113 so that a torque applied to the chucking portion 24 can be positively transmitted via the recesses 140 in combination with at least one elevation and, resp., one projection. Especially, the elevation may be in the form of a key. The screws 26 connecting the chucking portion 24 to the support plate 113 in a rotationally and axially fixed manner are located as far radially outside as possible so as to ensure high torque transmission.

Figure 14:
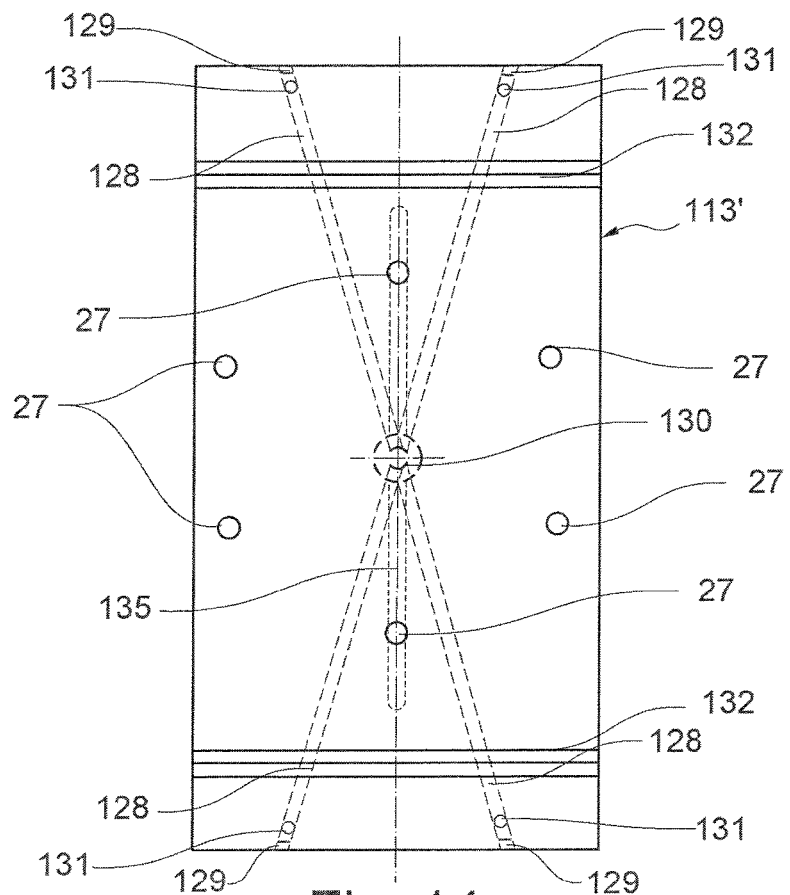
FIG. 14 shows a top view onto a support plate of the rotary tool.

FIG. 14 illustrates a tool component in the form of a support plate 113' according to another slightly modified embodiment which can be inserted into the rotary tool 101. FIG. 14 shows a top view onto the support plate 113' from the end face of the rotary tool 101, when the support plate 113' has been inserted in the latter. The support plate 113' includes the integrated cooling passages 128 which extend in X shape linearly radially outwardly, starting from the centrally arranged inlet 130 on the side of the chucking portion 24, and are sealed at the radial outside by means of a set screw 129 (indicated by a horizontal line only). The support plate 113' includes, on the side of the support portions 114 (when inserted in the rotary tool 101) radially further inside than the set screw 129, outlets 131 in the axial direction which include an opening only toward the support portions 114 and are fluid-communicated therewith. Thus, starting from the inlet 130, a fluid communication of the cooling passages 128 to the support portions 114 may be established.

The support plate 113' furthermore includes, on the side of the support portions 114, two parallel triangular grooves 132 which are arranged symmetrically to the axis of rotation A, are located radially as far outside as possible, extend linearly and in parallel to their lateral edge and which may positively engage in corresponding projections of the support portions 114. In this way, the support portions 114 are held, at least partially centered, in their position predetermined and pre-defined by the support plate 113', especially in the radial position, and moreover a torque can be positively transmitted. In general, form closure with other tool components having a play in a specifically defined direction by the support plate 113' helps to guide thermal expansion of other tool components in a directed manner. For example, the support plate 113' may include straight grooves and/or linear elevations, especially in the form of a key, so that a corresponding projection and, resp., a corresponding guiding groove permits movement due to thermal expansion in one direction.

On the side of the chucking portion 24 the support plate 113' equally includes a linear triangular groove 132 which extends through and, resp., intersects the axis of rotation A, is preferably aligned orthogonally to the cutting edges 4 and thus is orthogonal to the two triangular grooves 132 on the side of the support portions 114. In this way, a high torque can be positively transmitted from the chucking portion 24 to the support plate 113'. Alternatively to the triangular groove 132, the support plate 113' may also have an elevation or a projection e.g. in the form of a key which engages in a corresponding groove or a corresponding undercut of the chucking portion.

For being connected to a chucking portion in a rotationally and axially fixed manner, the support plate 113' additionally includes through-bores 27 which are arranged equally distributed about the axis of rotation A.

Figure 15:
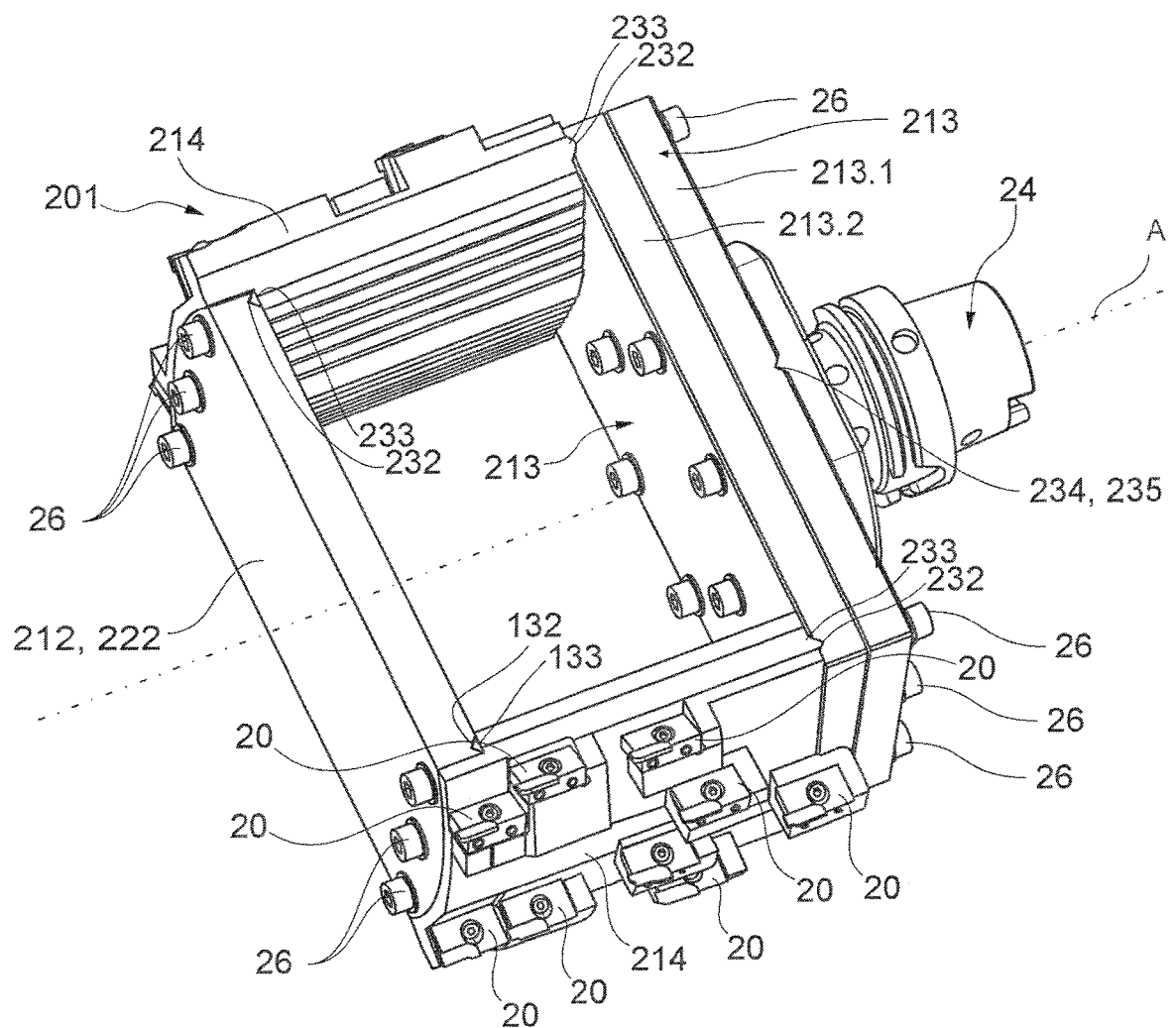
FIG. 15 shows a perspective view of a rotary tool according to the invention of a further third preferred embodiment.

FIG. 15 illustrates a rotary tool 201 according to the invention in accordance with a further third preferred embodiment. The rotary tool 201 in this embodiment includes a flat substantially rectangular backing plate 222 as stiffening structure 212 as well as a support plate system 213 consisting of first and second support plates 213.1, 213.2. The backing plate 222 has a triangular groove 232 extending concentrically to the axis of rotation A in the circumferential direction which positively engages in a corresponding concentric projection 233 of the support portions 214 in the circumferential direction so as to be positively centered and to be positively connected to the support portions 214 in the radial direction. The projection 233 extends in the axial direction and, resp., the triangular groove is withdrawn in the axial direction. In this embodiment, too, the backing plate 222 is enclosed in the radial direction by the two opposed support portions 214, whereas the support plate system 213 is axially offset against the support portions 214 and forms a radially outer surface of the rotary tool 201.

Both the backing plate 22 and the support plate system 213 are screwed to the support portions 214 in the axial direction by means of screws 26, with the screws 26 projecting through through-bores of the backing plate 222 as well as of the support plate system 213 (i.e. through through-bores in the first and second support plates 213.1, 213.2). The material of the backing plate 222 as well as of the support plate system 213 again is fiber-reinforced plastic composite comprising carbon fibers and/or PBO fibers as fiber component. The support plate 213.1 facing the chucking portion 24 includes, on the side of the chucking portion 24, a further straight triangular groove 234 orthogonal to the axis of rotation A whose direction of the recess is the axial direction in which a complementary triangular projection 235 of the chucking portion 24 is positively engaged. The triangular groove 234 is arranged and, resp., configured so that it is located symmetrically between the two support portions 214 so that an as high torque as possible can be transmitted to the cutting edges 4. In other words, the straight triangular groove 234 is located in a plane of symmetry between the support portions 114, wherein an imaginary extension of the straight triangular groove does not intersect the support portions 114.

When fiber-reinforced plastic composite comprising especially carbon fibers and/or PBO fibers are used for large-volume tool components, as afore-described, a mass of the rotary tool can be reduced by more than 20% compared to a rotary tool which almost completely includes titanium as material. Further, thermal expansion in a temperature change of 25K can be reduced by almost 30%, wherein a radial expansion (due to centrifugal forces) nevertheless can be kept constant during operation of the rotary tool. In this way, a support structure containing the material of fiber-reinforced plastic composite is excellently suited for a rotary cutting tool for machining large inside diameters. The rotary tool may thus be utilized with common spindles and it is not necessary to acquire new machine tools.

As a matter of course, deviations from the afore-described embodiments are possible without leaving the basic idea of the invention. For example, the manufacturing method of the fiber-reinforced plastic composite may deviate from the described variant to the effect that the fiber-reinforced plastic composite is produced by 3D print (additive manufacturing), with the fibers being embedded for example as endless fibers or endless fiber rovings into the matrix to be printed. In so doing, the fibers are arranged by means of a positioning device so that during matrix output and, resp., plastic output they are implemented in the component or the tool component directly by the plastic discharged. In this way, fiber-reinforced plastic composite tool components may be additively manufactured from granules comprising endless fibers, for example. The tool components can thus be applied to a movable component support in layers of extremely fine plastic drops by means of a specific nozzle and then can be structured to form 3D component parts.

At this point it is pointed out that the term "umbrella-like" covers different shapes. For example, the support structure, which expands like an umbrella from the coupling portion adjacent to the chucking portion, can have a circular outer contour around the axis of rotation on which the at least one cutting edge is arranged. Alternatively, the umbrella-like expanding support structure/carrier structure can also have a rectangular or polygonal outer contour seen in cross-section (seen in the direction of the axis of rotation A). In particular, the inner contour follows the outer contour of the carrier structure, i.e. in the case of a circular outer contour, the inner contour is also circular with a smaller diameter than the outer contour. For example, the support structure can be in the form of a circular cylinder with a bottom (pot/cup shape) or in the form of a rectangular hollow profile with a bottom. Of course, outer contours at least can be segment-by-segment circular with corresponding radius. In particular, the inner contour can be at least segmentally straight. Preferably, the support structure, which widens like an umbrella or mouth, can have a U- or C-profile in a side view. It should also be noted that alternatively the at least one cutting edge can also be formed or arranged indirectly or directly on the radial outer side of the stiffening structure, in particular in the form of the support plate or the support grid/lattice. The torque introduced via the chucking portion is also transmitted to the at least one cutting edge via the support structure, which is connected to the stiffening structure in a rotationally and axially fixed manner. In particular, the at least one cutting edge is formed or arranged in the immediate vicinity of the carrier structure.

In conclusion the subject-matter of the present invention is a tool with the following aspects and their combinations:

1. A rotary tool (1; 101; 201) for cutting large inside diameters at the outer circumference (2) of which at least one cutting edge (4) is arranged, comprising a support structure (10; 110; 210) which indirectly or directly supports the at least one cutting edge (4), and comprising a chucking portion (24) for coupling to a tool holder, wherein the support structure (10; 110; 210) widens in an umbrella-type manner or jaw-type manner starting from a coupling portion (11) adjacent to the chucking portion (24) and is radially stiffened by a stiffening structure (12; 112; 212).

2. The rotary tool (1; 101; 201) according to aspect 1, wherein the support structure (10; 110; 210) includes at least two support portions (14; 114; 214) diametrically opposed with respect to an axis of rotation (A) of the rotary tool (1; 101; 201), which support portions indirectly or directly support at least one respective cutting edge (4) and which are connected to each other by the stiffening structure (12; 112; 212).

3. The rotary tool (1) according to aspect 1 or 2, wherein the stiffening structure (12; 112) is in the form of a tension-compression strut frame.

4. The rotary tool (1; 101) according to any one of the aspects 1 to 3, wherein the stiffening structure (12; 112) includes at least two radially extending struts (22).

5. The rotary tool (1; 101) according to aspect 4, wherein the at least two struts (22) extend in a plane orthogonal to the axis of rotation (A) and preferably in parallel to each other.

6. The rotary tool (1; 101) according to aspect 5, wherein the stiffening structure (12) is lattice-shaped when viewed in the axial direction.

7. The rotary tool (1; 101) according to any one of the preceding aspects, wherein the stiffening structure (12; 112) includes at least two axially offset struts (22).

8. The rotary tool (1) according to any one of the aspects 4 to 7, wherein the stiffening structure (12) includes a strut (22) extending coaxially to the axis of rotation (A).

9. The rotary tool (1) according to any one of the preceding aspects, wherein the struts (22) are configured in cylindrical and/or rectangular shape.

10. The rotary tool (1) according to any one of the preceding aspects, wherein the support structure (10) is generatively manufactured.

11. The rotary tool (1; 101; 201) according to any one of the preceding aspects, wherein the support structure (10; 110; 210) has a thermal expansion coefficient of less than 10E-6 1/K.

12. The rotary tool (1) according to any one of the preceding aspects, wherein the support structure (10) is made from composite material comprising Invar and/or titanium.

13. The rotary tool (1) according to aspect 12, wherein at least the stiffening structure (12) is made from Invar.

14. The rotary tool (1) according to any one of the preceding aspects, wherein the umbrella-type support structure (10) is cup-shaped.

15. The rotary tool (1) according to any one of the preceding aspects, wherein the umbrella-type support structure (10) is configured in the form of a cup having two sides cut off in the axial direction, thus resulting in two flanks of the support structure (10).

16. The rotary tool (1; 101; 201) according to any one of the preceding aspects, wherein the material of the support structure (10; 110; 210) is a fiber-reinforced plastic composite including a matrix system comprising embedded fibers and the fiber-reinforced plastic composite has a thermal expansion coefficient of less than 5 ppm/K (5E-6 1/K), preferably of less than 2 ppm/K, especially preferred of less than 1 ppm/K, in at least one direction transversely to the axis of rotation (A).

17. The rotary tool (101; 201) according to aspect 16, wherein the fibers of the fiber-reinforced plastic composite are PBO fibers and/or CFRP fibers.

18. The rotary tool (101; 201) according to aspect 16 or 17, wherein the matrix system has a thermosetting plastic matrix, preferably vinyl ester resin, epoxy resin, phenol resin and/or unsaturated polyester resin, as matrix component.

19. The rotary tool (101; 201) according to any one of the aspects 16 to 18, wherein the fibers of the fiber-reinforced plastic composite are randomly embedded in the matrix system in at least a two-dimensional plane so as to achieve an at least two-dimensional isotropic property of the fiber-reinforced plastic composite.

20. The rotary tool (101; 201) according to any one of the aspects 16 to 19, wherein the fibers have a length ranging from 1 mm to 80 mm, especially preferred from 10 mm to 50 mm.

21. The rotary tool (101; 201) according to any one of the aspects 16 to 20, wherein the rotary tool (101; 201), preferably the support structure (110; 210), has a modular design with separately formed and interconnectable tool components, wherein the material of those modules which connect the support portions (14) in the radial direction is the fiber-reinforced plastic composite.

22. The rotary tool (1; 101; 201) according to any one of the aspects 2 to 21, wherein the support portions (14) are arranged in circle segment shape about the axis of rotation (A) and preferably include titanium as material.

23. The rotary tool (101; 201) according to any one of the aspects 16 to 22, wherein the support structure (110; 210) has a preferably rectangular or circular support plate aligned orthogonally to the axis of rotation (A) and made from fiber-reinforced plastic composite comprising PBO fibers and/or carbon fibers, which support plate is fastened, preferably screwed and/or adhesively joined to the chucking portion and to the support portions (14).

24. The rotary tool (101; 201) according to aspects 23, wherein the support plate includes at least one integrated cooling passage which conveys coolant from the chucking portion radially outwardly, preferably to the support portions (14).

25. The rotary tool (101; 201) according to any one of the aspects 16 to 24, wherein the stiffening structure is in the form of a backing plate or a backing lattice comprising the material of fiber-reinforced plastic composite.

26. The rotary tool (101; 201) according to any one of the aspects 23 to 25, wherein the support plate and/or the stiffening structure are screwed and/or adhesively joined to the support portions (14) in the axial direction.

27. The rotary tool (101; 201) according to any one of the aspects 16 to 26, wherein the support plate and/or the stiffening structure include(s) a groove, preferably a triangular groove, having a recess in the axial direction which extends preferably in the circumferential direction concentrically about the axis of rotation (A) and in which a projection complementarily formed at the support portions (14) is positively engaged to positively fix the support portions (14) vis-à-vis the support plate and, resp., the backing plate in the radial direction.

28. The rotary tool (101) according to any one of the aspects 16 to 24, wherein the support structure (110) is in the form of a hollow construction or a cage construction.

29. The rotary tool (101; 201) according to any one of the aspects 23 to 28, wherein, on the side facing away from the cutting edges, the support plate includes a straight groove, preferably a triangular groove orthogonal to the axis of rotation (A) in which a complementary projection of the chucking portion is positively engaged, wherein the groove is aligned so that it is located symmetrically between the two support portions (14).

30. The rotary tool (1; 101; 201; 301) according to any one of the preceding aspects, wherein the support structure (10; 110; 210) is formed to be point-symmetrical to the axis of rotation (A) of the rotary tool (1).

31. The rotary tool (1; 101; 201; 301) according to any one of the preceding aspects, wherein the rotary tool (1; 101; 201; 301) is adapted to cut an inside diameter of more than 200 mm.

32. The rotary tool (1; 101; 201) according to any one of the preceding aspects, wherein the rotary tool (1; 101; 201) is adapted to cut an inside diameter having a length of up to 400 mm.

33. The rotary tool (1; 101; 201) according to any one of the preceding aspects, wherein the at least one cutting edge (4) is formed directly at the support structure (10; 110; 210) or at a cutting member (5) supported by the support structure (10; 110; 210).

34. The rotary tool (1; 101; 201) according to aspect 33, wherein the cutting member (5) is held in an axially and/or radially adjustable cartridge (20).

35. The rotary tool (1; 101; 201) according to any one of the preceding aspects, wherein in the axial direction the support structure (10; 110; 210) is divided at least into a first and a second cutting step (19) each of which supports at least one cutting edge (4), with a cutting circle diameter (8) of the first cutting step (19) being different from that of the second cutting step (19).

36. The rotary tool (1; 101; 201) according to aspect 35, wherein in the axial direction the support structure (10; 110; 210) is divided into first to fifth cutting steps (19) which are arranged to be axially partially overlapping toward the chucking portion (24), with the cutting circle diameter (8) of the cutting steps (19) increasing toward the chucking portion (24).

37. The rotary tool (1; 101; 201) according to aspect 35 or 36, wherein the cutting edges (4) of the cutting steps (19) are arranged to be offset against each other in the circumferential direction about the axis of rotation (A).

38. The rotary tool (1; 101; 201) according to any one of the preceding aspects, wherein the rotary tool (1) is internally cooled.

LIST OF REFERENCE NUMERALS

1; 101; 201 rotary tool
2 outer circumference
4 cutting edge
5 cutting member
6 cutting circle
8 cutting circle diameter
10; 110; 210 support structure
11 coupling portion
12; 112; 212 stiffening structure
13 wall
14; 114; 214 support portion
16 radial outer surface 18 block-shaped projection
19 cutting step
20 cartridge
22 struts
22.1 connecting struts
22.2 stiffening strut
22.3 axial strut
24 chucking portion
25 flange
26 screws
27 through-bore
28 block shoulder
30 passage
113; 113' support plate
122; 222 backing plate
123 lateral plate
128 cooling passage
129 set screw
130 inlet
131 outlet
132; 232 triangular groove
134 circumferential undercut/groove
136 stop
138 base
140 recess
213 support plate system
213.1 first support plate
213.2 second support plate
222 backing plate
233 projection
234 linear triangular groove
235 projection flange
A axis of rotation

The invention claimed is:

1. A rotary tool for cutting large inside diameters at the outer circumference of which at least one cutting edge is arranged, comprising a support structure which indirectly or directly supports the at least one cutting edge, and comprising a chucking portion for coupling to a tool holder, wherein the support structure widens in an umbrella-type manner or jaw-type manner starting from a coupling portion adjacent to the chucking portion and is radially stiffened by a stiffening structure, wherein the stiffening structure is arranged radially inside the support structure that widens in an umbrella-type manner or jaw-type manner and wherein the stiffening structure is arranged axially offset to the coupling portion, wherein a material of the support structure comprises a fiber-reinforced plastic composite including a matrix system comprising embedded fibers and the fiber-reinforced plastic composite has a thermal expansion coefficient of less than 5 ppm/K in at least one direction transversely to an axis of rotation of the rotary tool.

2. The rotary tool according to claim 1, wherein the support structure includes at least two support portions diametrically opposed with respect to an axis of rotation of the rotary tool, which support portions indirectly or directly support at least one respective cutting edge and which are connected to each other by the stiffening structure.

3. The rotary tool according to claim 1, wherein the stiffening structure is in the form of a tension-compression strut frame.

4. The rotary tool according to claim 3, wherein the stiffening structure is lattice-shaped when viewed in the axial direction.

5. The rotary tool according to claim 1, wherein the support structure is generatively manufactured.

6. The rotary tool according to claim 1, wherein the support structure has a thermal expansion coefficient of less than 10E-6 1/K.

7. The rotary tool according to claim 1, wherein the support structure is made from composite material comprising Invar and/or titanium.

8. The rotary tool according to claim 1, wherein the umbrella-type support structure is configured in the form of a cup having two sides cut off in the axial direction, thus resulting in two flanks of the support structure.

9. The rotary tool according to claim 1, wherein the fibers of the fiber-reinforced plastic composite are PBO fibers and/or CFRP fibers.

10. The rotary tool according to claim 1, wherein the fibers of the fiber-reinforced plastic composite are randomly embedded in the matrix system in at least a two-dimensional plane so as to achieve an at least two-dimensional isotropic property of the fiber-reinforced plastic composite.

11. The rotary tool according to claim 1, wherein the rotary tool has a modular design with separately formed and interconnectable tool components, wherein the material of those modules which connect the support portions in the radial direction is the fiber-reinforced plastic composite.

12. The rotary tool according to claim 1, wherein the support structure includes at least two support portions arranged in circle segment shape about the axis of rotation.

13. The rotary tool according to claim 1, wherein the support structure has a support plate aligned orthogonally to the axis of rotation and made from fiber-reinforced plastic composite comprising PBO fibers and/or carbon fibers, which support plate is fastened to the chucking portion and to the support portions.

14. The rotary tool according to claim 1, wherein the stiffening structure is in the form of a backing plate or a backing lattice comprising the material of fiber-reinforced plastic composite.

15. The rotary tool according to claim 1, wherein the support structure is in the form of a hollow construction or a cage construction.

16. The rotary tool according to claim 1, wherein the support structure is formed to be point-symmetrical to an axis of rotation of the rotary tool.

17. The rotary tool according to claim 1, wherein the rotary tool is adapted to cut an inside diameter of more than 200 mm and/or to cut an inside diameter having a length of up to 400 mm.

18. The rotary tool according to claim 1, wherein in an axial direction the support structure is divided at least into a first and a second cutting step each of which supports at least one cutting edge, with a cutting circle diameter of the first cutting step being different from that of the second cutting step.

19. The rotary tool according to claim 1, wherein the stiffening structure includes at least two radially extending struts.

20. The rotary tool according to claim 1, wherein the stiffening structure includes at least two axially offset struts.

21. The rotary tool according to claim 1, wherein the umbrella-type support structure is cup-shaped.

22. A rotary tool for cutting large inside diameters at the outer circumference of which at least one cutting edge is arranged, comprising a support structure which indirectly or directly supports the at least one cutting edge, and comprising a chucking portion for coupling to a tool holder, wherein the support structure widens in an umbrella-type manner or jaw-type manner starting from a coupling portion adjacent to the chucking portion and is radially stiffened by a stiffening structure, wherein in an axial direction the support structure is divided at least into a first and a second cutting step each of which supports at least one cutting edge, with a cutting circle diameter of the first cutting step being different from that of the second cutting step.

23. The rotary tool according to claim 22, wherein the cutting edges of the cutting steps are arranged to be offset against each other in the circumferential direction about an axis of rotation.

24. The rotary tool according to claim 22, wherein the at least first and second cutting steps are arranged to be axially partially overlapping toward the chucking portion, with the cutting circle diameter of the at least first and second cutting steps increasing toward the chucking portion.

* * * * *